United States Patent
Yoshioka et al.

(10) Patent No.: US 6,681,650 B2
(45) Date of Patent: *Jan. 27, 2004

(54) DRIVING STATE SWITCHING UNIT WITH SYNCHRO-MECHANISM

(75) Inventors: Tadashi Yoshioka, Tokyo (JP); Shigeyuki Yoshida, Tokyo (JP); Kaoru Sawase, Tokyo (JP); Takahisa Niwa, Tokyo (JP); Yoshihiro Ikushima, Tokyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/259,424

(22) Filed: Sep. 30, 2002

(65) Prior Publication Data

US 2003/0045393 A1 Mar. 6, 2003

Related U.S. Application Data

(62) Division of application No. 09/647,716, filed as application No. PCT/JP00/00592 on Feb. 3, 2000, now Pat. No. 6,481,304.

(51) Int. Cl.[7] ............................................. F16H 59/00
(52) U.S. Cl. ..................................................... 74/335
(58) Field of Search ........................................... 74/335

(56) References Cited

U.S. PATENT DOCUMENTS

| | | |
|---|---|---|
| 4,911,031 A | 3/1990 | Yoshimura et al. |
| 5,053,962 A | 10/1991 | Genise |
| 5,832,777 A | 11/1998 | Weilant |
| 6,003,395 A * | 12/1999 | Rogg et al. .................... 74/335 |
| 6,019,009 A * | 2/2000 | Lee ............................... 74/335 |
| 6,164,149 A * | 12/2000 | Ohmori et al. ............. 74/336 R |
| 6,230,576 B1 * | 5/2001 | Yamada et al. ................ 74/335 |

FOREIGN PATENT DOCUMENTS

| | | |
|---|---|---|
| EP | 404387 A2 | 12/1990 |
| JP | 60-179557 | 9/1985 |
| JP | 61-45240 U | 3/1986 |
| JP | 63-154429 A | 6/1988 |
| JP | 2572064 | 11/1988 |
| JP | 3-24355 A | 2/1991 |

* cited by examiner

Primary Examiner—Dirk Wright
(74) Attorney, Agent, or Firm—Birch, Stewart, Kolasch & Birch, LLP

(57) ABSTRACT

Disclosed herein is a driving state switching unit with a synchro-mechanism which employs a synchro-mechanism to perform switching of a driving state. The switching unit is equipped with a first gear (32) and a second gear (33) coaxially disposed, a gear connecting member (34) axially movable so that the first gear (32) and the second gear (33) can be connected, and a synchro-mechanism (35) interposed between the first gear (32) and the second gear (33). By moving the gear connecting member (34) by an electric actuator (50), the first gear (32) and the second gear (33) are connected, while they are being synchronized by the synchro-mechanism (35). When this occurs, control means (102) controls a supply current to the electric actuator (50), and judgement means (102) judges synchronization of the synchro-mechanism (35), based on a change in the supply current value to the electric actuator (50). With this, the judgement of the synchronization of the synchro-mechanism (35) is made possible without providing dedicated sensors, switches, etc., and an accurate judgement, corresponding even to an individual difference in the sliding resistance between members and a change in running conditions, is made possible.

2 Claims, 14 Drawing Sheets

FIG. 2

① 2WD DETECTION SW
② 2WD/4WD DETECTION SW
③ 4WD DETECTION SW
④ C/D-LOCK DETECTION SW
⑤ 4LLC DETECTION SW

| T/F DRIVING MODE | POSITION SW | | | | |
|---|---|---|---|---|---|
| | ① | ② | ③ | ④ | ⑤ |
| 2WD | O | O | | | |
| (UNDER SWITCHING) | | O | | | |
| CENTER DIFF-4WD | | O | O | | |
| (UNDER SWITCHING) | | | O | | |
| DIRECT 4H | | | O | O | |
| (UNDER SWITCHING) | | | | O | |
| DIRECT 4L | | | | O | O |

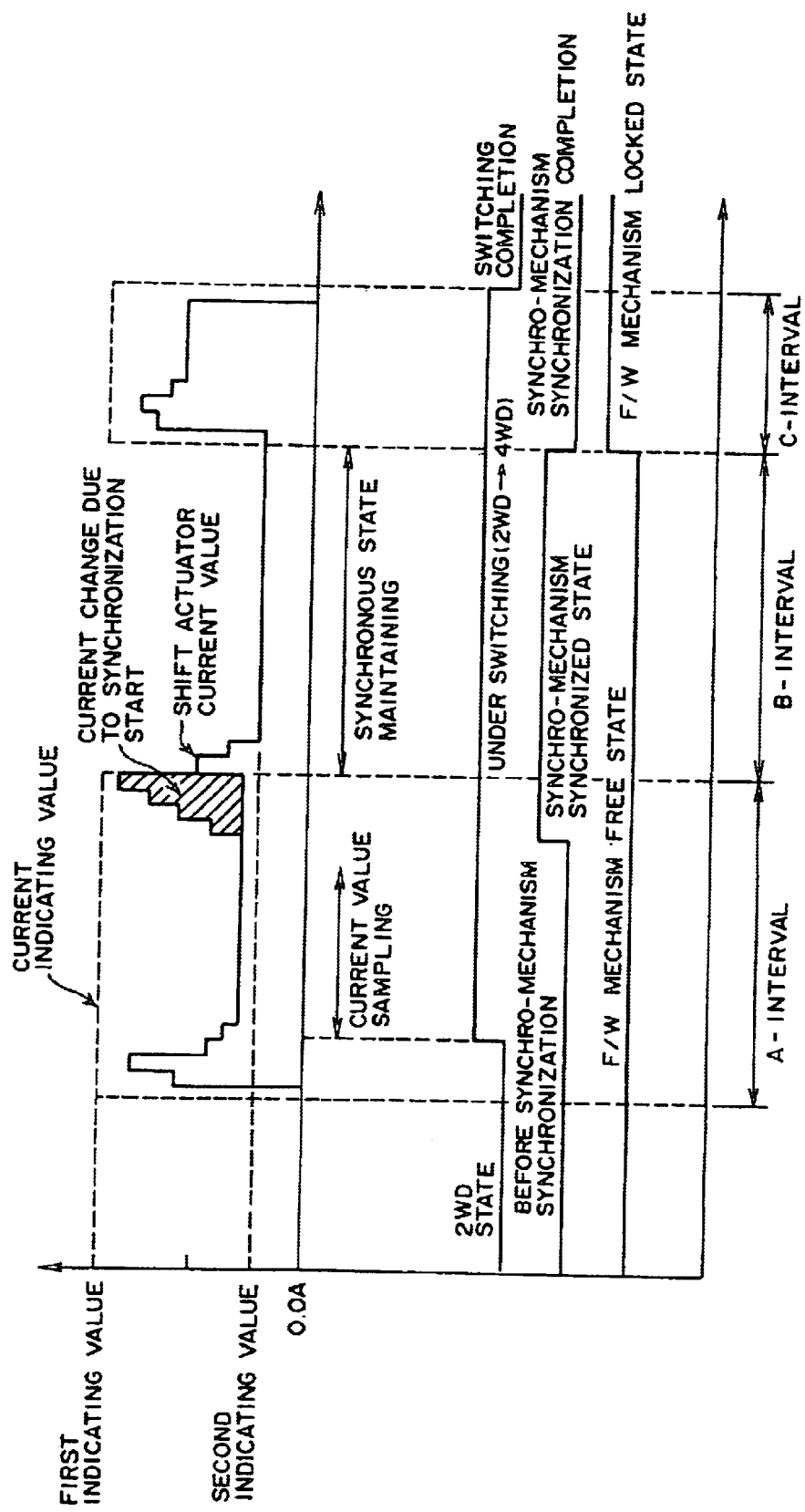

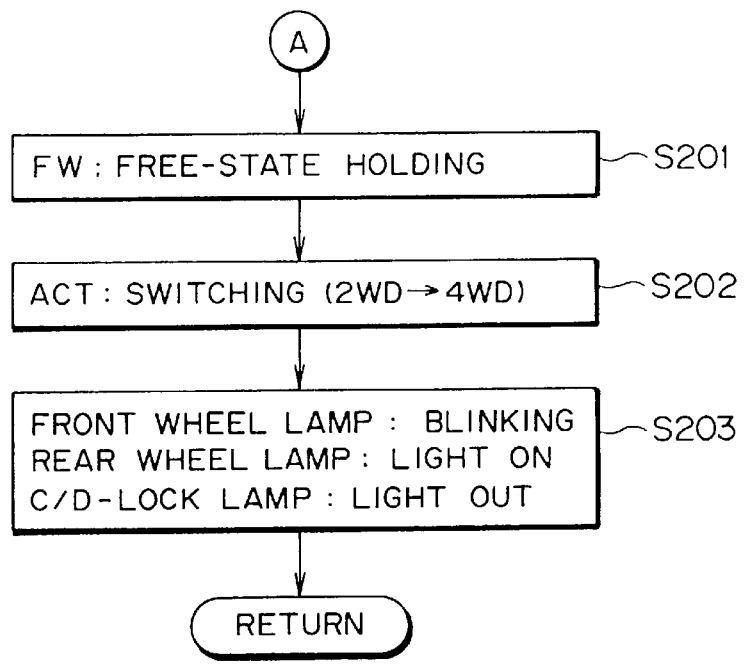
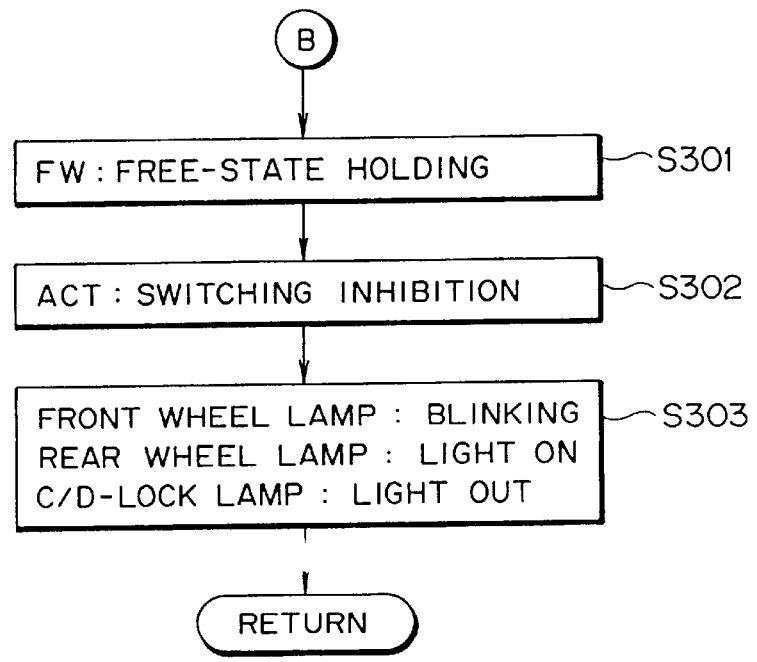

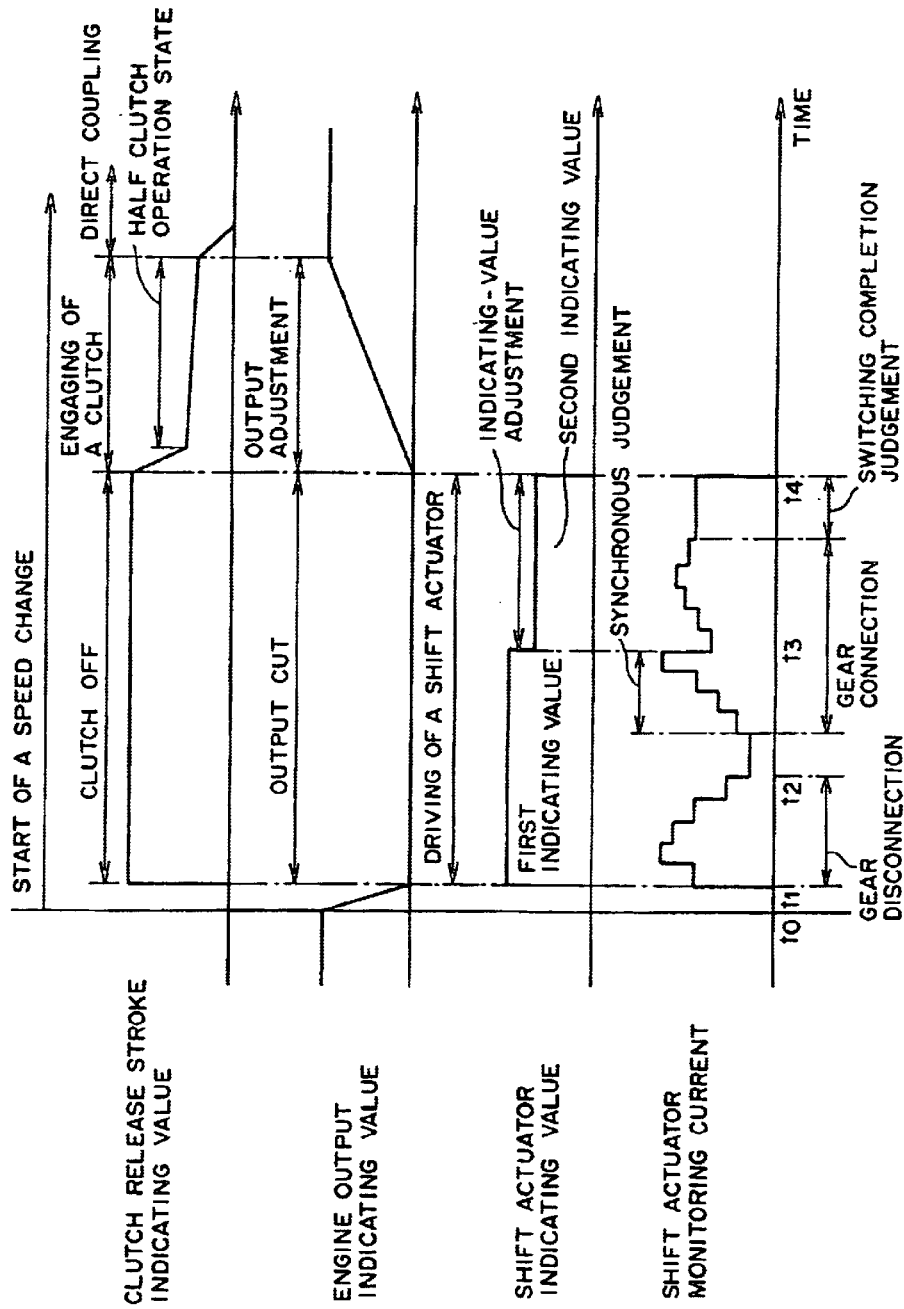

DRIVING STATE SWITCHING UNIT WITH SYNCHRO-MECHANISM

This application is a divisional of co-pending application Ser. No. 09/647,716, filed on Oct. 4, 2000 now U.S. Pat. No. 6,481,304 and for which priority is claimed under 35 U.S.C. §120. Application Ser. No. 09/647,716 is the national phase of PCT International Application No. PCT/JP00/00592 filed on Feb. 3, 2000 under 35 U.S.C. §371. The entire contents of each of the above-identified applications are hereby incorporated by reference. This application also claims priority of Application No. HEI11-028462 filed in Japan on Feb. 5, 1999 under 35 U.S.C. §119.

TECHNICAL FIELD

The present invention relates to a driving state switching unit with a synchro-mechanism that employs the synchro-mechanism to perform switching of a driving state.

BACKGROUND ART

In part-time four-wheel-drive vehicles capable of switching of a two-wheel-drive state (2WD) and a four-wheel-drive state (4WD), in the case where 2WD is selected, a transfer is constructed such that the transmission of power to either wheel side (generally front wheels) of the front and rear wheel sides is disconnected and that only the other wheel side (generally rear wheels) is driven. At this time, on the front wheel side where the transmission of power is disconnected, power loss will become greater in the case where all parts in the front driving system (e.g., a front propeller shaft, a front differential gear, a front axle shaft, etc.) rotate, as compared with the case where only tires and wheels are rotating.

Hence, free wheel mechanisms have hitherto been employed which are constructed so as to reduce power loss during 2WD and enhance fuel consumption, by releasing the connection between the front wheels and the front axle shaft, or by disconnecting the front axle front, during 2WD.

Also, in part-time four-wheel driving vehicles, in which a center differential unit with a limited slip differential mechanism is equipped in a transfer, driving performance as a four-wheel-drive (4WD) car, as well as conventional direct 4WD which is obtained by locking the center differential unit, is assured by setting the center differential unit free so that tight corner breaking is suppressed.

As described above, in the case of the four-wheel-drive vehicle, equipped with the free wheel mechanism, and capable of selecting center diff-4WD, there is a need to lock the free wheel mechanism being set free during 2WD, in switching the transfer from 2WD to center diff-4WD.

In the case where switching to center diff-4WD in the transfer is completed prior to locking of the free wheel mechanism, however, if a starting operation is performed before the free wheel mechanism is locked, the center differential unit will go to a idling state without transmitting engine power to the front wheels. As a result, the durability of the limited slip differential mechanism will be deteriorated and also a vehicle's driving stability will be lost.

Also, in the case where the free wheel mechanism has not been locked, there is a possibility that synchronization of the front driving system (driving system on a non-driving wheel side) will collapse in the course of a switch from 2WD to center diff-4WD. If switching is performed with the synchronization of the front driving system being in a collapsed state, there is a possibility that at the clutch parts of the synchro-mechanism, gear grind will take place and overloading be given.

Because of this, when switching the transfer from 2WD to center diff-4WD, the free wheel mechanism needs to be locked first, and switching to center diff-4WD needs to be then completed. For instance, in the technique disclosed in Japanese Patent No. 2572064, a direct 4WD state is first gone through when the transfer is switched from 2WD to center diff-4WD. And when this direct 4WD state is detected by a switch, the free wheel mechanism is locked. In this manner the above-mentioned problem is solved.

If a dedicated switch for detecting a direct 4WD state is provided as in the above-mentioned technique, however, costs will increase by that amount. In addition, if the direct 4WD state is gone through in switching the transfer from 2WD to center diff-4WD, driving performance, which would be obtained during 2WD or center diff-4WD, cannot be obtained during the direct 4WD state, and consequently, drivers will feel a sense of incompatibility.

Therefore, it is preferable that switching be performed directly from 2WD to center diff-4WD without going through the direct 4WD state. However, it becomes important to accurately judge the synchronous state of the synchro-mechanism of the transfer in order to prevent the drawbacks due to the aforementioned synchronization collapse on the non-driving wheel side. It is also important to suppress an increase in the cost by utilizing the existing equipment without providing dedicated switches, etc.

Furthermore, the importance of the judgement of the synchronization of the synchro-mechanism is not limited to the above-mentioned switching of a driving state in the transfer, but is generally common to units that employ a synchro-mechanism to perform switching of a driving state by the connection of gears. For example, the judgement of the synchronization of the synchro-mechanism becomes important even in automatic clutch systems.

The automatic clutch system abolishes a clutch pedal and automates shift switching, by adding actuators (a clutch actuator and a shift actuator) and sensors to a normal manual transmission. In this automatic clutch system, engaging and disengaging of a clutch are performed by a clutch actuator instead of driver's clutch-pedal manipulation. If the engaging timing of the clutch is much earlier than the synchronization of the synchro-mechanism of a transmission, however, there is a possibility that gear grind or overloading will occur. Conversely, if the engaging timing is much later, the time to change the vehicle speed will become longer and therefore the driver will feel a sense of incompatibility.

Because of this, in the conventional automatic clutch system there is a need to provide a stroke sensor (or a switch) for shift position detection in order to confirm the completion of the shift switching made by the shift actuator. However, if a dedicated switch for detecting shift position is provided in this manner, however, costs will increase by that amount.

As described above, in transfers, automatic clutch systems, etc., which employ a synchro-mechanism to perform switching of a driving state by the connection of gears, an accurate judgement of the synchronous state of the synchro-mechanism has been demanded in order to prevent gear grind or delay of switching due to a difference between the switch timing, and the synchronous timing of the synchro-mechanism, and also the realization of synchronization judging means, making use of the existing equipment, which will not incur an increased cost due to equipment such as dedicated sensors, switches, etc., has been desired.

The present invention has been made in view of such problems, and it is the object of the present invention to provide a driving state switching unit with a synchro-mechanism, capable of an accurate judgement of the synchronous state of the synchro-mechanism without providing dedicated sensors, switches, etc.

DISCLOSURE OF THE INVENTION

To achieve the above-mentioned object, the driving state switching unit with a synchro-mechanism of the present invention comprises a first gear and a second gear coaxially disposed; a gear connecting member axially movable so that the first gear and the second gear can be connected; and a synchro-mechanism interposed between the first gear and the second gear. By moving the gear connecting member by an electric actuator, the first gear and the second gear are connected through the gear connecting member, while they are being synchronized by the synchro-mechanism. When this occurs, control means controls a supply current to the electric actuator, and judgement means judges synchronization of the synchro-mechanism, based on a change in the supply current value to the electric actuator.

With this, the judgement of the synchronization of the synchro-mechanism becomes possible without providing dedicated sensors, switches, etc., and by performing the judgement on the basis of a change in the supply current value, an accurate judgement, corresponding even to an individual difference in the sliding resistance between members and a change in running conditions, becomes possible.

Preferably, the judgement means compares the aforementioned supply current value with an average supply current value for a predetermined time, and when a difference between the aforementioned supply current value and the aforementioned average supply current value exceeds a predetermined value, the judgement means judges that the synchro-mechanism is in a synchronous state. Since the average supply current value varies in correspondence to sliding resistance, a more accurate synchronous judgement becomes possible. Note it is preferable that the sampling of supply current values for computing an average supply current value be started, after surge current has flowed immediately after driving of the electric actuator.

Furthermore, the control means preferably controls the aforementioned supply current by setting a current indicating value to the electric actuator. And until the judgement means judges that the synchro-mechanism is in a synchronous state, the control means sets the current indicating value to a first indicating value, and furthermore, if it is judged that the synchro-mechanism is in a synchronous state, the control means sets the current indicating value to a second indicating value that is smaller than the first indicating value. With this, by first setting the current indicating value to the first indicating value that is greater, an early transition to the synchronous state becomes possible. And after synchronization, by setting the current indicating value to the second indicating value that is smaller, it becomes possible to connect gears with reliability without giving rise to gear grind, etc. Note it is preferred that the magnitude of the second indicating value be set according to a ratio of gears.

In addition, the aforementioned driving state switching unit with a synchro-mechanism may be equipped in a part-time four-wheel-drive vehicle and constructed as a driving state switching unit that performs switching of a driving state between a 2-wheel-drive state and a 4-wheel-drive state. The switching unit may further comprise a switching mechanism for switching the 2-wheel-drive state and the 4-wheel-drive state by switching an engagement relationship between the aforementioned plurality of gears through the synchro-mechanism. After switching of a driving state from the 2-wheel-drive state to the 4-wheel-drive state has been started by the switching mechanism, the judgement means may judge synchronization of the synchro-mechanism, based on a change in the supply current to the electric actuator.

With this, in the operation of switching a driving state from a 2-wheel-drive state to a 4-wheel-drive state, the judgement of the synchronization of the synchro-mechanism becomes possible without providing dedicated sensors, switches, etc., and costs can be reduced. In addition, an accurate judgement, corresponding even to an individual difference in the sliding resistance between members, a secular change, and a change in running conditions such as vehicle speed, accel opening degree and the like, becomes possible by judging synchronization on the basis of a change in the supply current value.

Preferably, the driving state switching unit with a synchro-mechanism further comprises a clutch unit, interposed between wheels which become non-driving wheels during the 2-wheel-drive state and a differential mechanism on the side of the wheels, for disconnecting the transmission of driving force from the differential mechanism to the wheels during the 2-wheel-drive state, and for transmitting the driving force from the differential mechanism to the wheels during the 4-wheel-drive state; and manipulation means for manipulating the clutch unit. In the operation of switching a driving state from a 2-wheel-drive state to a 4-wheel-drive state, in the case the judgement means judges that the synchro-mechanism is in a synchronous state, the control means maintains the synchronous state of the synchro-mechanism by controlling the supply current to the electric actuator and also switches the wheels, which are in a non-driving state, to a driving state by manipulating the clutch unit with the manipulation means. Also, when switching of the wheels to the driving state by the clutch unit is completed, the control means releases the maintaining of the synchronous state of the synchro-mechanism, and controls the supply current to the electric actuator so that the switching to the 4-wheel-drive state is completed.

Thus, when switching a driving state from a 2-wheel-drive state to a 4-wheel-drive state, the occurrence of misengagement at the synchro-mechanism, which is caused by synchronization collapse on the non-driving wheel side, can be prevented, by switching the wheels, which are in a non-driving state, to a driving state by manipulation of the clutch unit and then by completing the switching to a 4-wheel-drive state by release of the maintaining of the synchronous state of the synchro-mechanism. Particularly, in the case where there is provided a center differential unit having a limited slip differential mechanism, the deterioration of the durability of the limited slip differential mechanism due to idling of the center differential unit can also be prevented.

Furthermore, a difference in rotational speed between non-driving wheels and driving wheels is detected by detection means. If the rotational speed difference detected by the detection means exceeds a predetermined value, even in the case where the judgement means judges that the synchro-mechanism is in a synchronous state, the switching of the wheels to a driving state, which is performed by the clutch unit, is inhibited by inhibition means.

With this, even in the case where the synchro-mechanism is in a synchronous state, the switching to the driving state by the clutch unit is prevented if the rotational speed difference between non-driving wheels and driving wheels exceeds a predetermined value. Therefore, misengagement of the clutch due to a rotational speed difference can be prevented.

Moreover, the above-mentioned driving state switching unit with a synchro-mechanism may be constructed as a speed change stage switching unit for switching a stage of a speed change according to driver's shift manipulation. The switching unit may further comprise a switching mechanism for switching a stage of a speed change corresponding to a shift position selected by a driver, by switching an engagement relationship between the aforementioned plurality of gears through the synchro-mechanism. Also, the judgement means may judge synchronization of the synchro-mechanism, based on a change in the supply current to the electric actuator, after switching of the speed change stage has been started by the switching mechanism.

With this, in the operation of switching a stage of a speed change, the judgement of the synchronization of the synchro-mechanism becomes possible without providing dedicated sensors, switches, etc., and costs can be reduced. In addition, an accurate judgement, corresponding even to an individual difference in the sliding resistance between members, a secular change, and a change in running conditions such as vehicle speed, accel opening degree and the like, becomes possible by judging synchronization on the basis of a change in the supply current value.

Preferably, the control of the supply current to the aforementioned electric actuator by the control means is performed by a feedback control of setting a current indicating value to the electric actuator. And when the judgement means judges that the synchro-mechanism is in a synchronous state, the control means sets the current indicating value to a predetermined value corresponding to a speed change ratio of speed change stages in which current indicating values have been selected.

With this, it becomes possible to connect the gears of the switching mechanism at a speed corresponding to a ratio of speed change and therefore gear grind or overloading can be prevented. Note that it is preferable to set the current indicating value smaller if a ratio of speed change becomes greater.

Furthermore, preferably a clutch for connecting or disconnecting driving force, which is engaged or disengaged by the actuator, is interposed between an engine and the switching mechanism. When the aforementioned supply current becomes a constant or approximately constant value after the current indicating value has been set to a predetermined value corresponding to a speed change ratio of the speed change stages by the control means, engaging of the clutch is started by the actuator.

With this, it becomes possible to confirm the shift switching completion of the synchro-mechanism without providing dedicated sensor, switches, etc., and costs can be reduced. In addition, it becomes possible to engage the clutch at proper timing, and driver's sense of incompatibility due to the delay of the engaging timing of the clutch from the completion of shift switching can be prevented.

BRIEF DESCRIPTION OF THE DRAWINGS

In FIG. 1, it is indicated that the vehicle is in the center differential 4W state;

FIG. 2 is a correspondence diagram showing the relationship between detection switches and driving states, according to the driving state switching unit as the first embodiment of the present invention;

FIG. 5 is a timing chart for explaining a switching control from 2WD to center diff-4WD, according to the driving state switching unit as the first embodiment of the present invention;

FIG. 8 is a flowchart showing a switching control from 2WD to center diff-4WD, according to the driving state switching unit as the first embodiment of the present invention;

FIG. 9 is a flowchart showing a switching control from 2WD to center diff-4WD, according to the driving state switching unit as the first embodiment of the present invention;

FIG. 17 is a timing chart for explaining a control of switching a stage of a speed change, according to the speed change state switching unit as the second embodiment of the present invention.

BEST MODE FOR CARRYING OUT THE INVENTION

Embodiments of the present invention will hereinafter be described with reference to the drawings.

In a first embodiment of the present invention, a driving state switching unit with a synchro-mechanism of the present invention is equipped in a part-time four-wheel-drive vehicle and constructed as a driving state switching unit that performs switching of a driving stage between a two-wheel-drive state and a four-wheel-drive state. FIGS. 1 through 14 show a driving state switching unit as the first embodiment of the present invention, FIG. 1 being a diagram showing the construction of the driving system of a part-time four-wheel-drive vehicle to which the driving state switching unit is applied.

Figure 1:
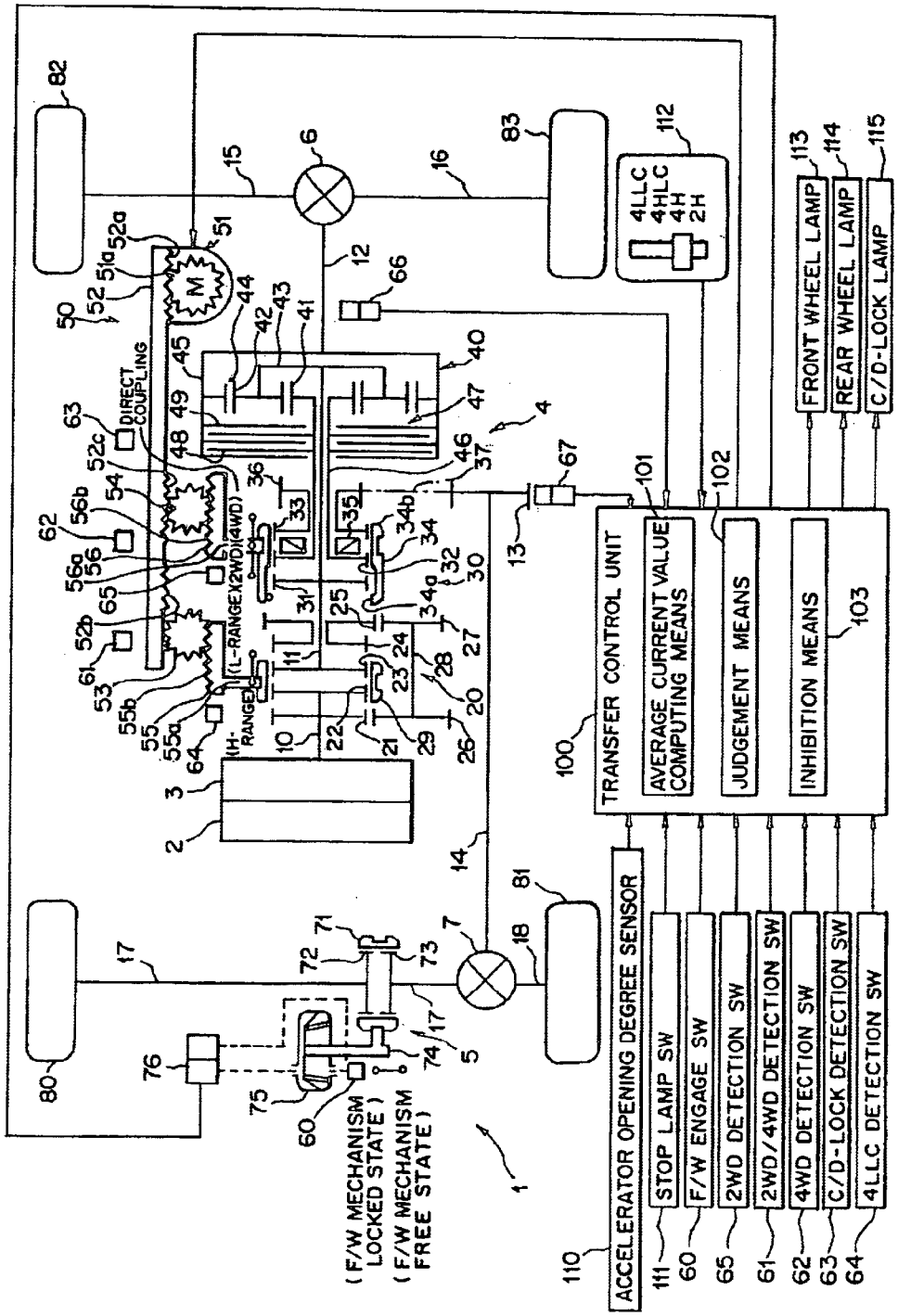
FIG. 1 is a schematic diagram of a part-time four-wheel-drive vehicle to which a driving state switching unit as a first embodiment of the present invention is applied.

As shown in FIG. 1, this vehicle 1 is a four-wheel-drive vehicle of a front engine rear drive (FR) base with drive by rear wheels 82, 83 as a base. Driving force is taken out from a transfer 4 and transmitted to front wheels 80, 81, whereby four-wheel drive is performed.

That is, in this vehicle 1, the driving force output from the engine 2 is input to the input shaft 10 of the transfer 4 through a transmission (T/M) 3, and within the transfer 4, is distributed to the side of the front wheels 80, 81 and the side of the rear wheels 82, 83 in accordance with the driving state, respectively. The driving force distributed to the side of the rear wheels 82, 83 is output from the output shaft 12 of the transfer 4 and is input to a rear differential unit (differential gear) 6 through a rear propeller shaft coupled to the rear output shaft 12. And the driving force is distributed right and left in accordance with the driving state and transmitted to the right and left rear wheels 82, 83 through rear axle shafts 15, 16.

On the other hand, the driving force distributed to the side of the front wheels 80, 81 is transmitted from a driving sprocket 36 of the transfer 4, through a transfer chain 37, and to a driven sprocket 13. A front propeller shaft 14 extends from the driven sprocket 13 to the front wheel side, the front end of the shaft 14 being connected to a front differential unit (differential mechanism) 7. Therefore, the driving force distributed to the driven sprocket 13 is input to the front differential unit 7 through the front propeller shaft 14, and at the front differential unit 7, is distributed right and left according to the driving state and transmitted to the right and left front wheels 80, 81 through front axle shafts 17, 18. Note that the axle shaft 17 on one side is equipped with a free wheel mechanism (clutch unit) 5.

Here, a description will be made in detail of the construction of the transfer 4. The transfer 4 is constructed primarily of a auxiliary transmission 20, a 2WD/4WD switching mechanism (switching mechanism) 30, and a center differential unit 40. The output from the transmission 3 is first input to the auxiliary transmission 20.

The auxiliary transmission 20 switches and outputs the rotation input from the transmission 3, in two stages, high speed (high) and low speed (low), by moving a high/low switching sleeve 29. More specifically, between the input shaft 10 and the rear output shaft 12, a transfer driving shaft 11 for inputting the driving force from the auxiliary transmission 20 to the center differential unit 40 is equipped on the same shaft as these shafts 10, 12. The auxiliary transmission 20 is equipped with an input gear 21 and a clutch gear 22 provided coaxially and integrally on the input shaft 10, a high/low clutch hub (clutch gear) 23 provided coaxially on and separately from the transfer driving shaft 11, a clutch gear 24 provided coaxially and integrally on one end of the transfer driving shaft 11, and a high/low switching sleeve 29 provided on the outer peripheries of these clutch gears 22, 23, 24.

The clutch gears 22, 23, 24 are axially juxtaposed, and the high/low switching sleeve 29 is provided such that it meshes these gears 22, 23, 24 to connect or disconnect the rotation between the clutch gears 22 and 23, or between the clutch gears 23 and 24. Furthermore, a low speed gear 25 is supported on the transfer driving shaft 11 so that it is free to rotate.

In addition, the auxiliary transmission 20 is equipped with a counter shaft 28 in parallel with the input shaft 10 and the transfer driving shaft 11. Counter gears 26, 27 are equipped coaxially and integrally on both ends of the counter shaft 28, and mesh the input gear 21 and the low speed gear 25, respectively. Note that the low speed gear 25 is larger in diameter (i.e., greater in number of teeth) than the input gear 21, while the counter gear 26 meshing the input gear 21 is conversely larger in diameter than the counter gear 27 meshing the low speed gear 25.

With construction such as this, in the auxiliary transmission 20, in the case where the high/low switching sleeve 29 connects the clutch gears 22, 23 together, the rotation transmitted from the T/M 3 to the input shaft 10, as it is, is transmitted to the transfer driving shaft 11 through the clutch gear 22, the high/low switching sleeve 29, and the clutch gear 23 (the position of the high/low switching sleeve 29 at this time will hereinafter be referred to as a high position).

On the other hand, in the case where the clutch gears 23, 24 are connected, the clutch gears 22, 23 are disconnected and therefore the transmission of rotation directly from the input shaft 10 to the transfer driving shaft 11 is not performed. The rotation transmitted from the T/M 3 to the input shaft 10 is transmitted from the input gear 10, through the counter gear 26, the counter shaft 28, and the counter gear 27, and to the low speed gear 25. When this occurs, speed reduction is performed. And the reduced rotation is transmitted to the transfer driving shaft 11 through the clutch gear 24, the high/low switching sleeve 29, and the clutch gear 23 (the position of the high/low switching sleeve 29 at this time will hereinafter be referred to as a low position).

The output of the auxiliary transmission 20 is transmitted to the center differential unit 40 through the transfer driving shaft 11. The center differential unit 40 is of a planetary gear type and constructed of a ring gear 44 equipped in a diff-case 45, and a sun gear 41 meshing the ring gear 44 through a plurality of planetary gears 42. And the transfer driving shaft 11 is coupled to a carrier 43 freely rotatably supporting the planetary gears 42, and the output of the auxiliary transmission 20 is transmitted to the carrier 43.

The sun gear 41 is fixedly secured coaxially and integrally to one end of an inner sleeve 46, freely rotatably supported on the transfer driving shaft 11. A 2WD/4WD clutch gear (2WD/4WD clutch hub) 32 constituting the 2WD/4WD switching mechanism 30 is equipped coaxially and integrally on the other end of the inner sleeve 46. That is, the distribution of the driving force to the front wheel side, among the driving force input from the transfer driving shaft 11 to the carrier 43, is performed from the sun gear 41 and through the inner sleeve 46. On the other hand, the distribution of the driving force to the rear wheel side, among the driving force input from the transfer driving shaft 11 to the carrier 43, is performed from the rear output shaft 12 connected coaxially to the diff-case 45.

In addition, the center differential unit 40 is provided with a viscous coupling unit (VCU) 40 as a limited slip differential mechanism. In this embodiment, the viscous case of the VCU 47 is integral with the diff-case 45, the inner peripheral surface of which is provided with a plurality of outer plates 48. The inner sleeve 46 is also used as the viscous hub, and a plurality of inner plates 49 are alternately provided on the outer peripheral surface of the inner sleeve 46 with respect to the outer plates 48. That is, both the output from the inner sleeve 46 to the front wheel side and the output from the diff-case 45 to the rear wheel side are adjusted by the VCU 47. When a difference in rotation occurs between the inner sleeve 46 and the inner plate 49, and the diff-case 45 and the outer plate 48, the driving force is transmitted from the high speed rotation side to the low speed rotation side. In this manner, redistribution of output is performed, whereby differential motion is limited.

Next, a description will be given of the 2WD/4WD switching mechanism 30. The 2WD/4WD switching mechanism 30 has both a function as a transfer and a function of locking the center differential unit 40, and performs switching of each function by moving the 2WD/4WD switching sleeve 34. That is, the 2WD/4WD switching mechanism 30 is equipped with a clutch gear (differential locking hub) 31 coaxially integral with the transfer driving shaft 11, a 2WD/4WD clutch gear (clutch hub, first gear) 32, a clutch gear (second gear) 32 coaxially integral with the driving sprocket 36 supported outside the inner sleeve 46, and the 2WD/4WD switching sleeve (gear connecting member) 34 provided so that it can abut and mesh the outer peripheries of these clutch gears 31, 32, 33. In accordance with the relationship of mesh between these clutch gears 31, 32, 33 and the 2WD/4WD switching sleeve 34, switching of a driving mode is performed.

More specifically, the 2WD/4WD switching sleeve 34 has two internal gear portions 34a, 34b. When the 2WD/4WD switching sleeve 34 is located at its foremost position, the clutch gears 31, 32 are connected by the internal gear portion 34b. Also, when the 2WD/4WD switching sleeve 34 is located at its intermediate position, the clutch gears 32, 33 are connected by the internal gear portion 34b, and when it is located at its rearmost position, all the clutch gears 31, 32, 33 are connected through the internal gears 34a, 34b.

First, a description will be made in the case where the clutch gears 31, 32 are connected. When this occurs, rotation of the inner sleeve 47 is restricted by the transfer driving shaft 11, and the sun gear 41 and the carrier 43 are united as one body. Because of this, the pinion gears 42 cannot rotate on their own axes, and the ring gear 44 rotates at the same speed as the sun gear 41 and the carrier 43. Therefore, the center differential unit 40 goes to its diff-lock state. In addition, the clutch gear 33 is released, so there is no possibility that the driving force will be transmitted to the front wheel side. Therefore, in this case, the driving state of the vehicle 1 goes to a 2WD state in which the rear wheels 82, 83 are used as driving wheels (the position of the 2WD/4WD switching sleeve 34 at this time will hereinafter be referred to as a 2WD position).

Next, in the case where the clutch gears 32, 33 are connected, the clutch gear 31 is released and the diff-lock state of the center differential unit 40 is released (i.e., it goes to a diff-free state). And since the clutch gears 32, 33 are connected, the transmission path of the driving force to the front wheel side is formed and the driving state of the vehicle 1 goes to a center diff-4WD state. That is, the driving force, input from the transfer driving shaft 11 to the carrier 43, is transmitted to the inner sleeve 46 through the sun gear 41 and is output through the connection of clutch gears 32, 33 and from the driving gear 36 to the front wheel side. In addition, the driving force is transmitted to the diff-case 45 through the ring gear 44 and is output from the rear output shaft 12 to the rear wheel side. Note that since the VCU 47 is provided between the output to the front wheel side and the output to the rear wheel side, redistribution of output is performed when a difference in rotation occurs between both (the position of the 2WD/4WD switching sleeve 34 at this time will hereinafter be referred to as a center diff-4WD position). Note that a synchro-mechanism 35 for smoothly performing the connection of the clutch gears 32, 33 is provided between the clutch gears 32, 33. This will hereinafter be described.

And in the case where all the clutch gears 31, 32, 33 are connected, the transmission path of the driving force to the front wheel side is formed, as with the case where the clutch gears 32, 33 are connected, as described above. Furthermore, the clutch gear 31 is connected with the clutch gears 32, 33. As a result, the center differential unit 40 goes to a diff-lock state. That is, in this case, the driving state of the vehicle 1 goes to a direct 4WD state, whereby the driving force is always distributed to the front wheel side and the rear wheel side in proportion to respective vehicle loads (the position of the 2WD/4WD switching sleeve 34 at this time will hereinafter be referred to as a direct 4WD position).

While the auxiliary transmission 20, the 2WD/4WD switching mechanism 30, and the center differential unit 40 are constructed as described above, the transfer is further equipped with a shift actuator (electric actuator) 50 for performing the switching control of the high/low switching sleeve 29 of the auxiliary transmission 20 and also the switching control of the 2WD/4WD switching sleeve 34 of the 2WD/4WD switching mechanism 30.

The shift actuator 50 is constructed primarily of an electric motor 51, a main shift shaft 52, a high/low switching shift rail 55, and a 2WD/4WD switching shift rail 56. A shift fork 55a equipped in the high/low switching shift rail 55 is engaged by the high/low switching sleeve 29, and a shift fork 56a equipped in the 2WD/4WD switching shift rail 56 is engaged by the high/low switching sleeve 34. And an electric motor 51 is rotated by an instruction from a transfer control unit (or control means, which will hereinafter be referred to as a TCU), whereby the shift rails 52, 55, 56 are driven. In this manner, the switching control of the high/low switching sleeve 29 and also the switching control of the high/low switching sleeve 34 are performed.

More specifically, the output shaft of the electric motor 51 is equipped with a pinion 51a, which in turn meshes a rack 52a of the main shift rail 52. In addition, the main shift rail 52 is further provided with racks 52b, 52c. The rack 52b meshes a rack 55b equipped in the high/low switching shift rail 55, through a pinion 53 in which the position of its axis is fixed. The rack 52c meshes a rack 56b equipped in the 2WD/4WD switching shift rail 56, through a pinion 54 in which the position of its axis is fixed. Note that the racks 52b, 52c of the main shift rail 52 do not mesh the pinions 53, 54 at all times, but mesh them in accordance with the position of the main rail shift 52 that is driven by the electric motor 51.

The relationship between the position of the main shift rail 52 and the driving state of the vehicle 1 will be described in the case where the main shift rail 52 has been located at its rearmost position. (FIG. 1, upper right). First, in this case, the high/low switching sleeve 29 is at the high position and the 2WD/4WD switching sleeve 34 is at the 2WD position. Therefore, the driving state of the vehicle 1 is in the 2WD state.

When the electric motor 51 is rotated to advance (FIG. 1, counterclockwise) the main shift rail 52 from the above-mentioned position, the 2WD/4WD switching shift rail 56 retreats through the rack 52c, the pinion 54, and the rack 56b. The 2WD/4WD switching sleeve 34 connects the clutch gears 32, 33, together and also releases the connection of the clutch gears 31, 32. That is, the 2WD/4WD switching sleeve 34 is located at the center diff-4WD position. On the other hand, since the rack 52b has not meshed the pinion 53 yet, no driving force is transmitted to the high/low switching shift rail 55, and the high/low switching sleeve 29 remains at the high position. Therefore, the driving state of the vehicle 1 goes to the center diff-4WD state.

Furthermore, if the electric motor 51 is rotated to advance the main shift rail 52, the 2WD/4WD switching shift rail 56 further retreats through the rack 52c, the pinion 54 and the rack 56b. The 2WD/4WD switching sleeve 34 holds the connection of the clutch gears 32, 33 and further connects the clutch 31 with them. As a result, the 2WD/4WD switching sleeve 34 is located at the direct 4WD position. Therefore, the driving state of the vehicle 1 goes to the direct 4WD state. However, since the rack 52b has not meshed the pinion 53 yet, no driving force is transmitted to the high/low switching shift rail 55 and therefore the high/low switching sleeve 29 remains at the high position (this driving state will hereinafter be referred to as direct 4H).

And if the electric motor 51 is rotated to advance the main shift rail 52 to the foremost position, the mesh between the rack 52c and the pinion 54 is released and therefore no driving force is transmitted to the 2WD/4WD switching shift rail 56. As a result, the 2WD/4WD switching sleeve 34 remains at the direct 4WD position. On the other hand, because the rack 52b meshes the pinion 53, the advancement of the main shift rail 52 causes the high/low switching shift rail 55 to retreat through the rack 52b, the pinion 52, and the rack 55b. With this, the high/low switching sleeve 29 releases the connection of the clutch gears 22, 23 and connects the clutch gears 23, 24 together. That is, the high/low switching sleeve 29 is located at the low position, and speed reduction at the second transmission 20 is performed (this driving state will hereinafter be referred to as direct 4L).

Note that the above-mentioned shift positions can be detected by a combination of signals from a 2WD/4WD detection switch 61 disposed to abut the main shift rail 52, a 4WD detection switch 62, a center diff (C/D) lock detection switch 63, a 4LLC detection switch 64 disposed to abut the high/low switching shift rail 55, and a 2WD detection switch 65 disposed to abut the 2WD/4WD switching shift rail 56.

That is, recesses (see FIGS. 3 and 4) 91 through 95, which correspond to the switches 61 through 65, are provided on the shift rails 52, 55, 56, and the switches 61 through 65 are switched on when detecting these recesses 91 through 95 (when their point ends are inserted into the recesses). The positions of the recesses 91 through 95 on the shift rails 52, 55, 56, which correspond to the switches 61 through 65, are as follows:

First, the recess 91 provided on the main shift rail 52 is disposed at a position where the 2WD/4WD detection switch 61 abuts it when the 2WD/4WD switching sleeve 34 is at the 2WD position or center diff-4WD position. The recess 92 likewise provided on the main shift rail 52 is disposed at a position where it abuts the 4WD detection switch 62, when the 2WD/4WD switching sleeve 34 is at the center diff-4WD position or direct diff-4WD position, and also when the high/low switching sleeve 29 is at the high position. The recess 93 similarly provided on the main shift rail 52 is disposed at a position where it abuts the center diff-lock detection switch 63 when the 2WD/4WD switching sleeve 34 is at the direct 4WD position.

In addition, the recess 94 provided on the high/low switching shift rail 55 is disposed at a position where it abuts the 4LLC detection switch 64, when the 2WD/4WD switching sleeve 34 is at the direct 4WD position, and also when the high/low switching sleeve 29 is at the low position. The recess 95 provided on the 2WD/4WD switching shift rail 56 is disposed at a position where it abuts the 2WD detection switch 65 when the 2WD/4WD switching sleeve 34 is at the 2WD position.

With the aforementioned setting of the positions of the recesses 91 through 95 on the shift rails 52, 55, 56, when the 2WD detection switch 65 and the 2WD/4WD detection switch 61 are on, as shown in FIG. 2, it can be judged that the driving state of the vehicle 1 is in the 2WD state. Similarly, when the 2WD/4WD detection switch 61 and the 4WD detection switch 62 are on, it can be judged that it is in the center diff-4WD state. When the 4WD detection switch 62 and the center diff-lock detection switch 63 are on, it can be judged that it is in the direct 4H state. When the center diff-lock detection switch 63 and the 4LLC detection switch 64 are on, it can be judged that it is in the direct 4L state. It can also be judged that the driving state of the vehicle is in the course of a switch between driving states. Note that the detection signals from the switches 61 through 65 are input to the TCU 100, in which the aforementioned judgements are made.

The auxiliary transmission 20, 2WD/4WD switching mechanism 30, center differential unit 40, and shift actuator 50, described above, are housed integrally within a transfer case (not shown) and constitute the transfer 40.

Next, a description will be given of the free wheel mechanism 5. The free wheel mechanism 5 is a device for reducing power loss during 2WD. As shown in FIG. 1, the free wheel mechanism 5 disconnects the front axle shaft 17 at the intermediate portion, and the end portion thereof is equipped with clutch gears 72, 73, which are connected or disconnected by a sleeve 71. The sleeve 71 is driven by a vacuum actuator 75. The TCU 100 controls a solenoid (manipulation means) 76, thereby changing the direction in which negative pressure acts within the vacuum actuator 75. With this, the position of a shift rod 74 which engages the sleeve 71 can be adjusted in two stages.

For instance, during 4WD (center diff-4WD, direct 4H, direct 4L), the shift rod 74 is pulled toward the side of the vacuum actuator 75 and therefore the sleeve 71 goes to a state (free-wheel (F/W) mechanism locked state) in which the clutch gears 72, 73 are connected. The Front wheel 80 and the front differential unit 7 are connected through the front axle shaft 17. Therefore, during 4WD, the driving force input from the front propeller shaft 14 to the front differential unit 7 is equally distributed right and left at the front differential unit 7 and is transmitted to the front wheels 80, 81 through the front axle shafts 17, 18.

On the other hand, during 2WD, the shift rod 74 is pushed forward (in FIG. 1, downward) by the vacuum actuator 75 and therefore the sleeve 71 goes to a state (free-wheel mechanism free state) in which the connection of the clutch gears 72, 73 is released. The front wheel 80 and the front differential unit 7 are disconnected. With this, the side gear of the front differential unit 7 on the side of the front wheel 81 idles. Therefore, during 2WD, the front driving system from the front differential unit 7 to the driving sprocket 36 will no longer rotate, whereby power loss is reduced.

Note that whether the free wheel mechanism 5 is in a locked state or in a free state is judged by the TCU 100 based on a detection signal from a free-wheel engage switch 60 disposed to abut the shift rod 74. That is, when the shift rod 74 moves so that the point end of the free-wheel engage switch 60 is inserted into a recess provided at a predetermined position on the shift rod 74, the free-wheel engage switch 60 is switched on and the TCU 100 judges the free wheel mechanism to be in a locked state.

While a description has been made of the construction of the part-time four-wheel-drive vehicle to which this driving state switching unit is applied, a description will next be given of the TCU 100 that controls the driving state of the above-mentioned vehicle.

As previously described, in addition to the detection signals from the switches 60 through 65, an accel opening degree signal from an accel opening degree sensor 110, a break signal from a stop lamp switch 111, and furthermore, a selector position signal (driving mode selection signal) from a selector switch 112 equipped in a selector lever (driving mode selecting lever) are input to the TCU 100. In addition, a detection signal for the rotational speed of the rear output shaft (rear propeller shaft) 12 is input from a rear propeller shaft speed sensor (detection means) 66, and a detection signal of the rotational speed of the front propeller shaft 14 is input from a front propeller shaft speed sensor (detection means) 67.

Based on these signals, the TCU 100 controls, as appropriate, the electric motor 51 of the shift actuator 50 and the solenoid 76 of the free wheel mechanism 5, thereby controlling the driving state of the vehicle 1. Here, FIGS. 3 through 6C show control that is performed in switching the driving state from 2WD to center diff-4WD. A method of controlling switching of the driving state from 2WD to center diff-4WD will hereinafter be described with reference to FIGS. 3 through 6C. Note that in the longitudinal sections of the essential parts shown in FIGS. 3 and 4, while hatching (oblique lines) is applied to the section of the casing and the section of the transfer drive shaft, and the like.

Figure 3:
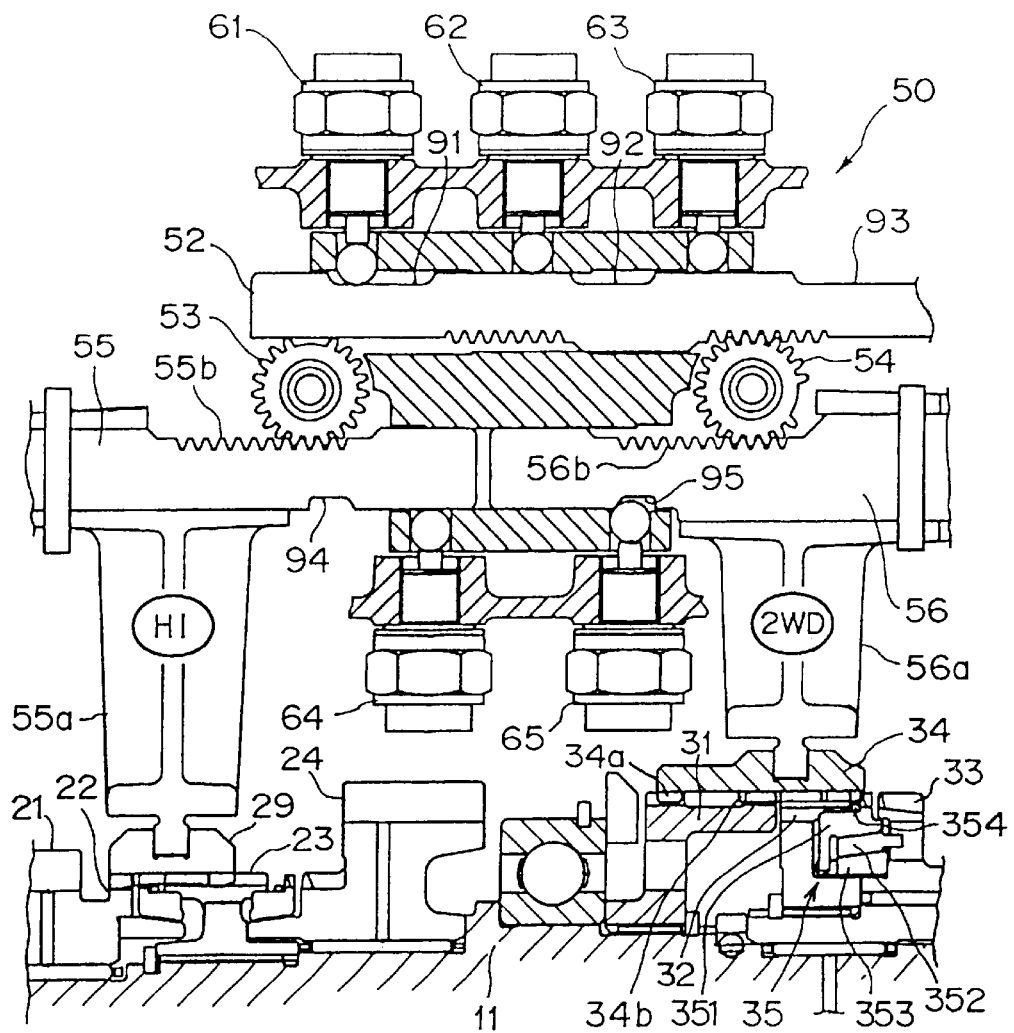
FIG. 3 is an essential vertical sectional view of a transfer during 2WD, according to the driving state switching unit as the first embodiment of the present invention.
Figure 6A:
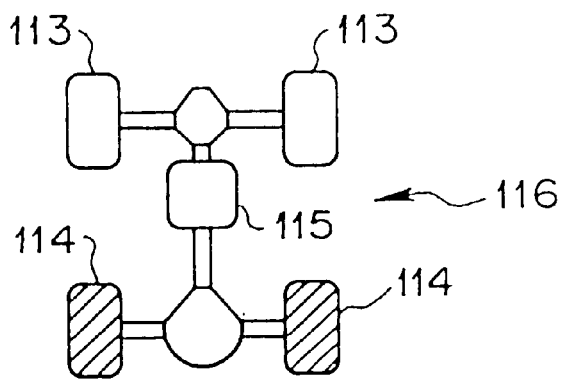
FIG. 6A is a diagram showing the indication of an indicator lamp during 2WD, according to the driving state switching unit as the first embodiment of the present invention.

First, when the driving state of the vehicle 1 is in the 2WD state, as shown in FIG. 3, the high/low switching sleeve 29 is located on the high position side where the clutch gear 22 and the clutch gear 23 are connected, and the 2WD/4WD switching sleeve 34 is located on the 2WD position side where the clutch gear 31 and the clutch gear 32 are connected. At this time, the 2WD detection switch 65 and the 2WD/4WD detection switch 61 are on. In an indicator lamp 116 within an inner panel, as shown in FIG. 6A, front wheel lamps 113 and a center diff-lock lamp 115 are switched off, and rear wheel lamps 114 are switched on. With this, the driver can recognize that the driving state of the vehicle 1 is now in the 2WD state. In addition, the free wheel mechanism 5 is in a free state. Note that in FIGS. 6A through 6C, lighting of the lamps 113, 114, 115 is indicated by oblique lines, and blinking is indicated by oblique lines and radial lines around the oblique lines. In addition, lights-out is not indicated by oblique lines, etc.

If, in such a state, the driver shifts the selector lever from the 2H (2WD) position to the 4H (center diff-4WD) position, a selector mode signal is input from the selector switch to the TCU 100. When the following conditions are established, the TCU 100 starts switching of the driving state to the center diff-4WD state, by controlling the electric motor 51 of the shift actuator 50 and the solenoid 76 of the free wheel mechanism 5.

First, the first condition for the start of switching is that the vehicle 1 is traveling at intermediate and low speeds, i.e., that the speed, detected based on a detection signal from the rear propeller shaft speed sensor 66, is less than or equal to a predetermined value. And the second condition is that the opening degree of the accel detected by the accel opening degree sensor 110 is less than or equal to a predetermined value, and the third condition is that the absolute value of the acceleration or deceleration of the vehicle 1 is less than or equal to a predetermined value. Note that the acceleration or deceleration is computed based on a detection signal from the rear propeller shaft speed sensor 66. These conditions are set so that switching in such a situation can be prevented, because there is a possibility that the synchro-mechanism 35 will give rise to a synchronization defect and deteriorate durability, if switching is performed during high-speed travel or acceleration.

When the aforementioned conditions are all established, the TCU 100 starts a current-value control (feedback control) for supplying current to the electric motor 51 of the shift actuator 50, in order to move the 2WD/4WD switching sleeve 34 from the 2WD position to the center diff-4WD position where the clutch gear 32 and the clutch gear 33 are connected. When this occurs, a current indicating value (target value for feedback control) is set to a first indicating value higher than a surge current value to be assumed, because surge current flows immediately after start of the electric motor 51, as shown in FIG. 5.

Figure 6B:
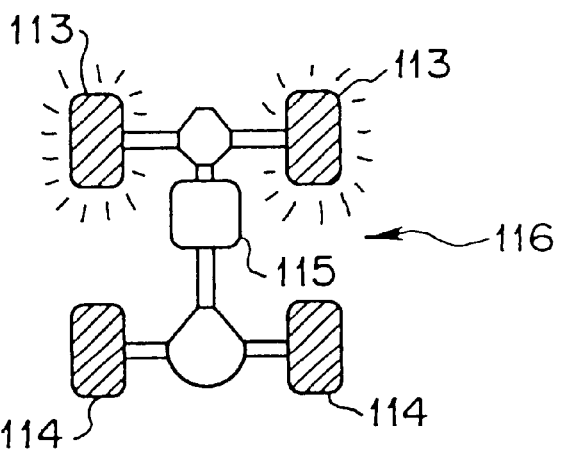
FIG. 6B is a diagram showing the indication of an indicator lamp in the course of switching the driving state from 2WD to center diff-4WD, according to the driving state switching unit as the first embodiment of the present invention.

Also, if the 2WD/4WD switching sleeve 34 starts moving, the 2WD detection switch 65 is switched on and the 2WD/4WD detection switch 61 alone is switched on. With this, in the indicator lamp 116, as shown in FIG. 6B, the center diff-lock lamp 115 remains switched off and the rear wheel lamp 114 switched on, while the front wheel lamp 113 begins to blink. With this, the driver can recognize that the driving state of the vehicle 1 is in the course of a switch from 2WD to center diff-4WD.

When the 2WD/4WD switching sleeve 34 moves from the 2WD position to the center diff-4WD position, sliding resistance will occur on the contact surface between the 2WD/4WD switching sleeve 34 and the diff-lock hub 31, and between the 2WD/4WD switching sleeve 34 and the 2WD/4WD clutch sleeve 32. Therefore, the electric motor 1 requires an amount of thrust which can oppose this sliding resistance, and a current the value corresponding to the required thrust is supplied to the electric motor 51. When this occurs, average current value computing means 101, which is a functional element of the TCU 100, samples the value of supply current for a predetermined time (monitor current values, i.e., actual values in the feedback control) after surge current has flowed, and computes the average value.

The synchro-mechanism 35, incidentally, is provided between the 2WD/4WD clutch hub 32 and the clutch gear 33. In this embodiment, the synchro-mechanism 35 adopts a double cone type. An inner ring 353 is disposed inside a center cone 352, supported and anchored on the clutch gear 33, and an outer ring 351 is disposed outside the center cone 352. In addition, a synchronizing spring 354 contacts the outside of the outer ring 351.

Because of this, if the 2WD/4WD switching sleeve 34 moves to the center diff-4WD position side, the outer ring 351 is pushed against the center cone 352 through the synchronizing spring 354. Thereafter, the 2WD/4WD switching sleeve 34 engages the chamfered portion of the outer ring 351, whereby the clutch hub 32 and the clutch gear 33 are synchronized.

In the case where synchronization by the synchro-mechanism 35 is started in this manner, movement of the 2WD/4WD switching sleeve 34 is interrupted once by the outer ring 351 and goes to a decelerated or stopped state. Because of this, a current value to be supplied to the electric motor 51 gradually increases as shown in FIG. 5 (see the oblique line portion of FIG. 5), in accordance with the resistance exerted on the 2WD/4WD switching sleeve 34. Hence, in judgement means 102 which is another functional element of the TCU 100, when the difference between the current value supplied to the electric motor 51 and the average current value computed by the average current value computing means 101 exceeds a predetermined threshold value, it is judged that synchronization by the synchro-mechanism 35 has been started.

The reason that the above-mentioned average current value is thus used as a criterion for judging the start of synchronization that is performed by the synchro-mechanism 35 is as follows: That is, although the current value to be supplied to the electric motor 51 is proportional to the sliding resistance between the 2WD/4WD switching sleeve 34 and the clutch gears 31, 32, this sliding resistance changes variously, depending on running conditions such as the speed of a vehicle, the opening degree of an accel, etc. Therefore, if a criterion for judgement is fixed, it will be subjected to the influence of running conditions and therefore an accurate judgement cannot be made. Hence, the average current value that varies according to running conditions is used as a criterion for judgement so that an accurate judgement of synchronization can be guaranteed.

And when the start of synchronization by the synchro-mechanism 35 is judged by the judgement means 102, the TCU 100 sets the current indicating value set to the first indicating value, to a second indicating value lower than the first indicating value (for the above, A-interval).

By reducing the current indicating value in this manner, a current value to be supplied to the electric motor 51 is also reduced and the 2WD/4WD switching sleeve 34 is held at the present position. Therefore, the synchronous state of the synchro-mechanism 35 is also maintained.

Next, the TCU 100 controls the solenoid 76 and drives the vacuum actuator 75, while holding the current indicating value at the second indicating value to maintain the synchronous state of the synchro-mechanism 35. In this manner the free wheel mechanism 5 being in a free state is locked.

However, in the case where a difference in speed between front and rear wheels that is computed from the detection signals of the rear propeller shaft speed sensor 66 and the front propeller shaft speed sensor 67, strictly speaking, the case where a difference in speed between front and rear wheels which occurs when the rotation of the front propeller shaft 14 is transmitted to the front wheels 80, 81 with the free wheel mechanism 5 locked, has exceed a predetermined value, locking of the free wheel mechanism 5 is inhibited by inhibition means 103 equipped in the TCU 100. This is because, in the case where the synchro-mechanism 35 goes to a completely synchronous state so that the rotational speeds of the clutch gears 32, 33 coincide, the above-mentioned speed difference between front and rear wheels does not occur; however, in the case where this value exceeds a predetermined value, it cannot be said that the synchro-mechanism 35 is completely in a synchronous state. And if it is assumed that the front wheels 80, 81 are rotating at the same speed as the rear wheels 82, 83, even if the free wheel mechanism 5 is locked in such a state, a difference in speed between the clutch gears 72, 73 is too great and therefore there is a high possibility that misengagement will take place. Hence, until the above-mentioned speed difference between front and rear wheels becomes a predetermined value or less, locking of the free wheel mechanism 5 is not performed (for the above, B-interval).

And if the speed difference between front and rear wheels becomes a predetermined value or less, the free wheel mechanism 5 is caused to be in a locked state. When the free wheel engage switch 60 goes to an ON state, the TCU 100 again raises the current indicating value to the first indicating value. With this, the 2WD/4WD switching sleeve 34 is subjected to strong thrust applied by the electric motor 31 and moves to the side of the center diff-4WD position across the synchro-mechanism 35, and engages the clutch gear 33 and releases engagement with the diff-lock hub 31.

Figure 4:
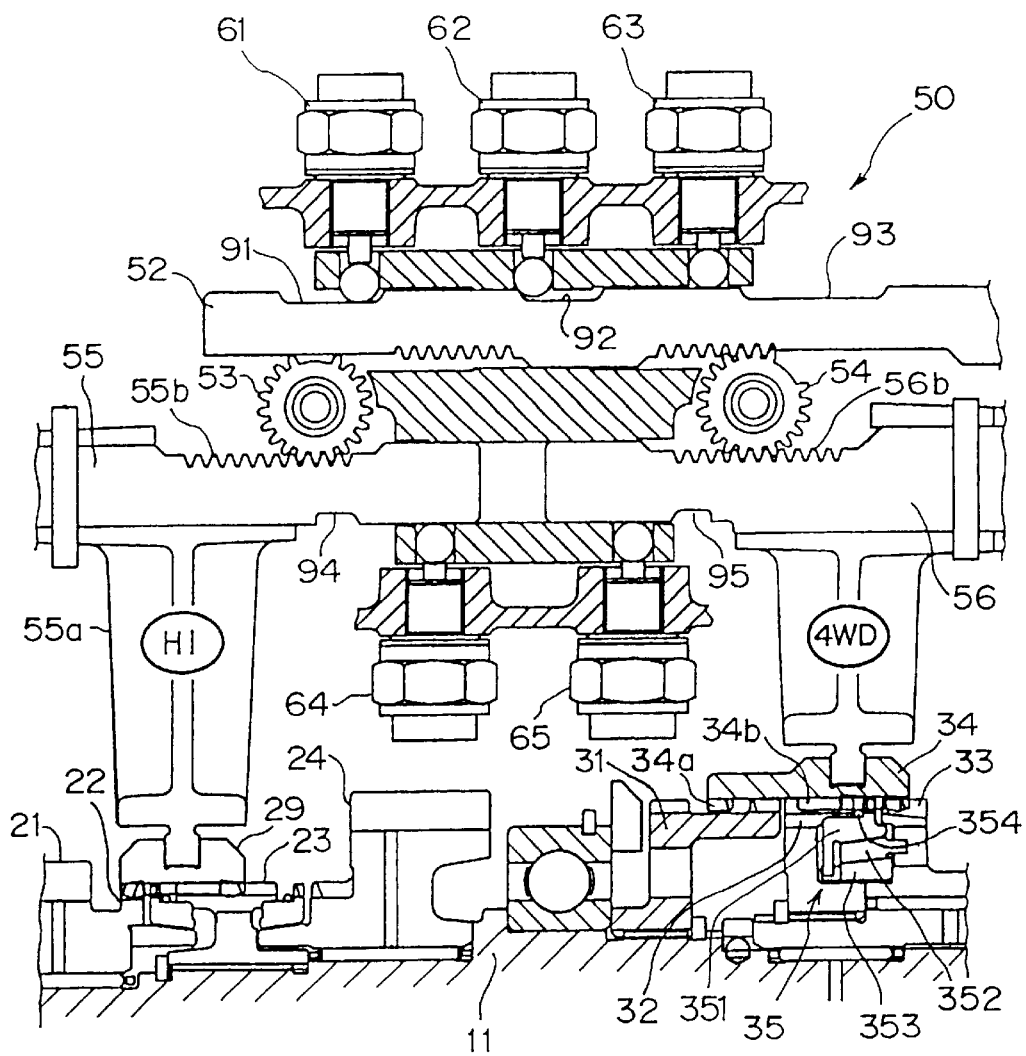
FIG. 4 is an essential vertical sectional view of the transfer during center diff-4WD, according to the driving state switching unit as the first embodiment of the present invention.
Figure 6C:
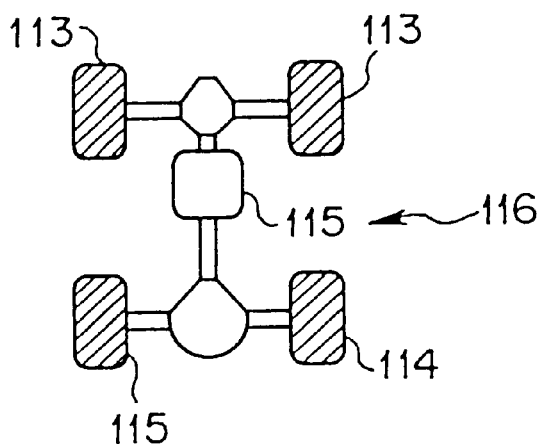
FIG. 6C is a diagram showing the indication of an indicator lamp during center diff-4WD, according to the driving state switching unit as the first embodiment of the present invention.

And if the movement of the 2WD/4WD switching sleeve 34 to the center diff-4WD position is completed as shown in FIG. 4, the 4WD detection switch 62, in addition to the 2WD/4WD detection switch 61, also goes to an ON state. With this, in the indicator lamp 116, as shown in FIG. 6C, the front wheel lamp 113 stops blinking and is switched on at all times. Therefore, the driver can recognize that the driving state of the vehicle 1 has completely been switched to the center diff-4WD state. With the completion of the switching to the center diff-4WD state, the TCU 100 stops the supply of current to the electric motor 51 (for the above, C-interval).

Since the part-time four-wheel-drive vehicle to which the driving state switching unit as the first embodiment of the present invention is applied is constructed as described above, control is performed, for example, according to flowcharts shown in FIGS. 7 through 14, when the driving state is switched from 2WD to center diff-4WD.

Figure 7:
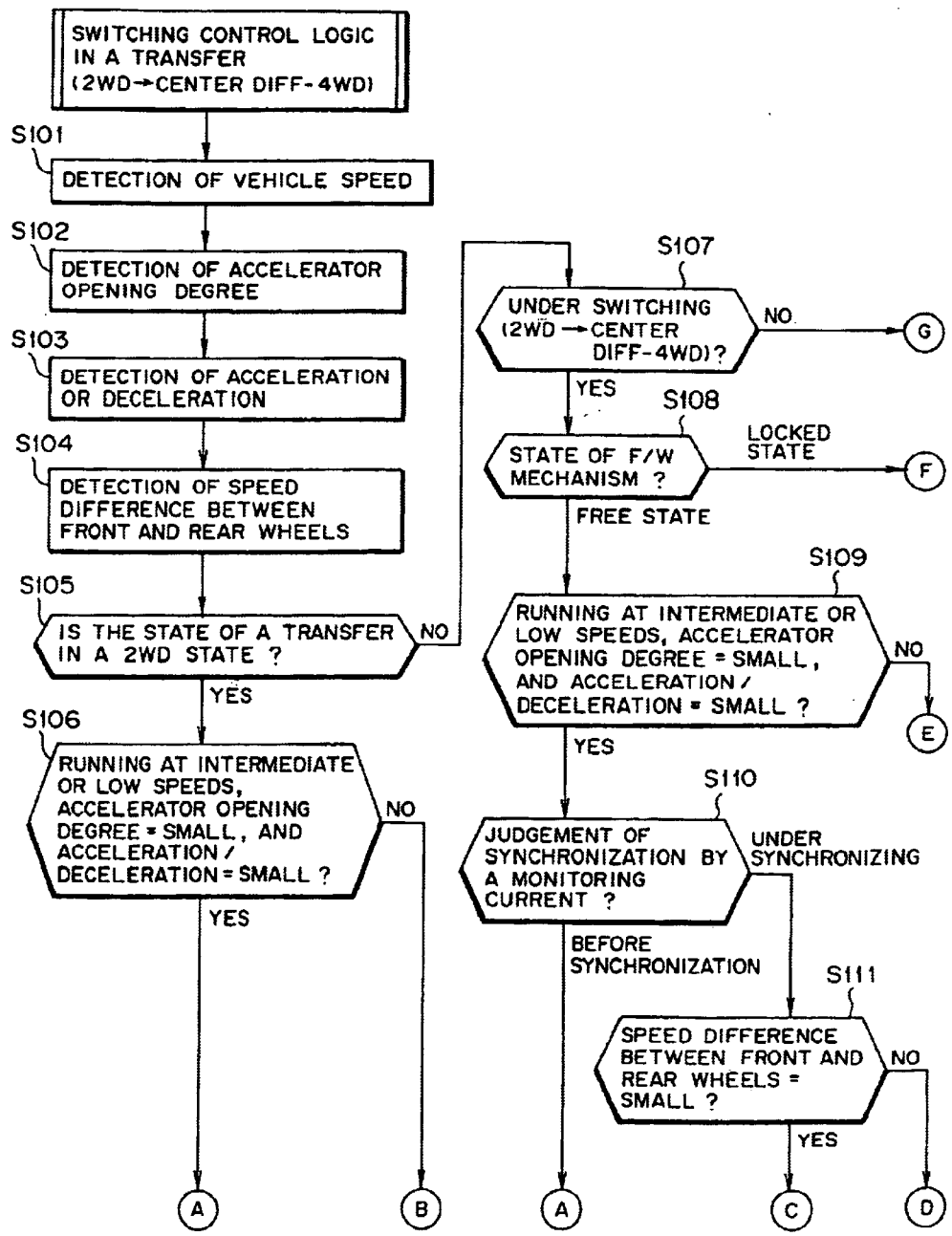
FIG. 7 is a flowchart showing a switching control from 2WD to center diff-4WD, according to the driving state switching unit as the first embodiment of the present invention.

As shown in FIG. 7, in the TCU 100, the speed of the vehicle is first detected based on a detection signal from the rear propeller shaft speed sensor 66 (step S101), and the opening degree of the accel is detected based on a detection signal from the accel opening degree sensor 110 (step S102). In addition, the acceleration or deceleration of the vehicle is detected based on a detection signal from the rear propeller shaft speed sensor 66 (step S103), and a difference in speed between front and rear wheels is detected based on a detection signals from the rear propeller shaft speed sensor 66 and front propeller shaft speed sensor 67 (step S104).

And in the case where the transfer 4 is still in the 2WD state, i.e., the case where the 2WD detection switch 65 and the 2WD/4WD detection switch 61 are both on (step S105), it is judged whether or not the vehicle 1 is traveling at intermediate and low speeds, and whether or not the opening degree of the accel and the acceleration (or deceleration) are both small (step S106).

In the case where the condition in step S106 is met, the process moves to step S201 of FIG. 8. With the free wheel mechanism (FW) 5 held in a free state (step S201), the electric motor 51 of the shift actuator (ACT) 50 is driven, whereby switching of the 2WD/4WD switching sleeve 34 from the 2WD position to the center diff-4WD position is started (step S202). With this, in the indicator lamp 116, the front lamp 113 that has been switched off starts blinking (step S203).

On the other hand, in the case where the condition in step S106 is not met, the process moves to step S301 of FIG. 9. The free wheel mechanism 5 is held in a free state (step S301), and the shift actuator 50 is inhibited from performing switching (step S302). Even in this case, in order to display that the selector lever has been manipulated by the driver, the indicator lamp 116 starts blinking the front wheel lamp 113 that has been switched off (step S303).

Also, returning to FIG. 7, in the case where in step S105 the transfer 4 has not gone to the 2WD state yet, i.e., the case where the 2WD detection switch 65 is off, it is further judged whether or not the transfer 4 is in the course of a switch from 2WD to center diff-4WD, i.e., whether or not only the 2WD/4WD detection switch 61 is on (step S107).

And in the case where it is judged that the transfer 4 is in the course of a switch from 2WD to center diff-4WD, the state of the free wheel mechanism 5 is judged based on the signal from the free wheel engage switch 60 (step S108). In the case where it is in a free state, it is further judged whether or not the vehicle 1 is traveling at intermediate and low speeds, and whether or not the opening degree of the accel and the acceleration (or deceleration) are both small (step S109).

Figure 12:
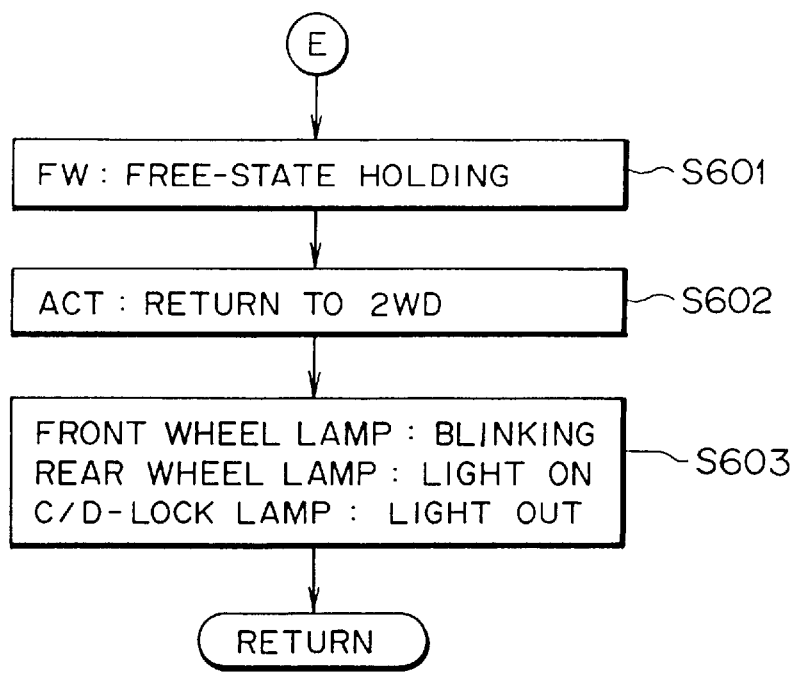
FIG. 12 is a flowchart showing a switching control from 2WD to center diff-4WD, according to the driving state switching unit as the first embodiment of the present invention.

In the case where the condition in step S109 is not met, the process moves to step S601 of FIG. 12. With the free wheel mechanism 5 held in a free state (step S601), the electric motor 51 of the shift actuator (ACT) 50 is driven, whereby the 2WD/4WD switching sleeve 34 is returned to the 2WD position (step S602). With this, in the indicator lamp 116, the front lamp 113 remains blinking (step S603).

On the other hand, in the case where the condition in step S109 is met, a current value being actually supplied to the electric motor 51 is monitored and whether or not the synchro-mechanism 35 has started synchronization is judged (step S110).

In the case where the difference between the monitoring current value, and the average current value for a predetermined time is smaller than a predetermined threshold value, it is judged that synchronization has not been started yet. And the process moves to step S201 of FIG. 8, and with the free wheel mechanism 5 held in a free state (step S201), the electric motor 51 of the shift actuator 50 is driven, whereby the switching of the 2WD/4WD switching sleeve 34 from the 2WD position to the center diff-4WD position is continued (step S202). When this occurs, in the indicator lamp 116 the front wheel lamp 113 remains blinking (step S203).

On the other hand, when the difference between the monitoring current value, and the average current value for a predetermined time exceeds a predetermined threshold value, it is judged that the synchro-mechanism 35 has started synchronization, and furthermore, it is judged whether or not the difference in speed between front and rear wheels is smaller than a predetermined value (step S111).

Figure 10:
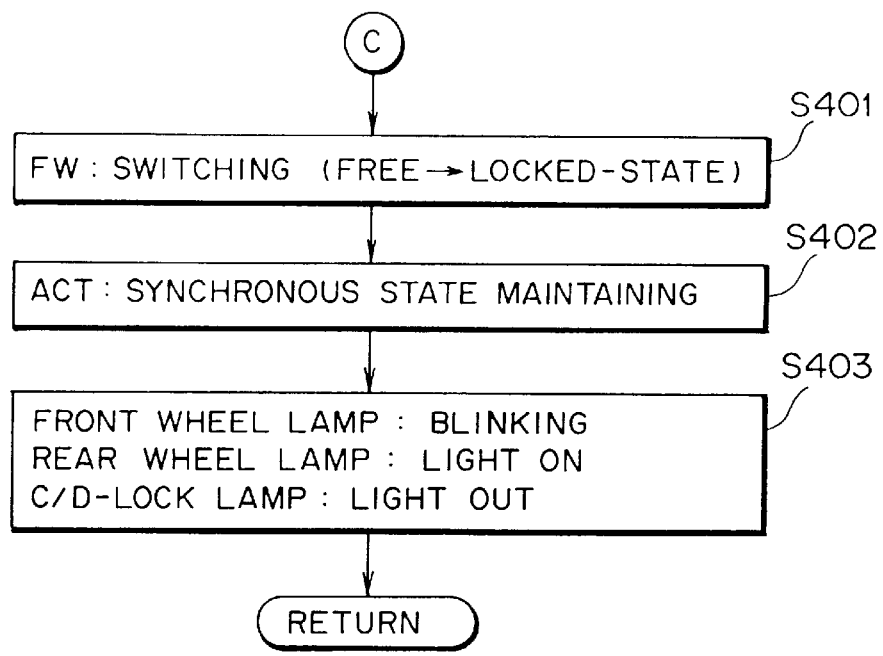
FIG. 10 is a flowchart showing a switching control from 2WD to center diff-4WD, according to the driving state switching unit as the first embodiment of the present invention.

And in the case where the speed difference between front and rear wheels is the predetermined value or less, the process moves to step S401 of FIG. 10. The solenoid 76 is controlled to drive the vacuum actuator 75. With this, the free wheel mechanism 5 is switched from the free state to the locked state (step S401). During this, the current indicating value to the electric motor 51 of the shift actuator 50 is set to the second indicating value smaller than the initial first indicating value, whereby the synchronous state of the synchro-mechanism 35 is maintained (step S402). Even in this case, the front wheel lamp 113 of the indicator lamp 116 remains blinking (step S403).

Figure 11:
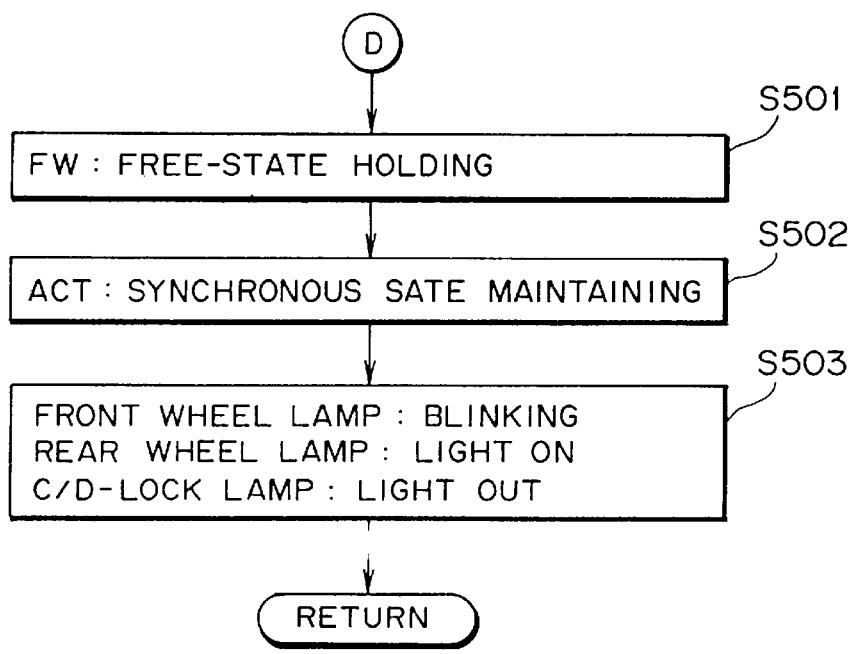
FIG. 11 is a flowchart showing a switching control from 2WD to center diff-4WD, according to the driving state switching unit as the first embodiment of the present invention.

On the other hand, in the case where the speed difference between front and rear wheels has exceeded the predetermined value, the process moves to step S501 of FIG. 11. With the free wheel mechanism 5 held in the free state (step S501), the shift actuator 50 maintains the synchronous state of the synchro-mechanism 35 (step S502). Even in this case, the front wheel lamp 113 of the indicator lamp 116 remains blinking (step S503).

Figure 13:
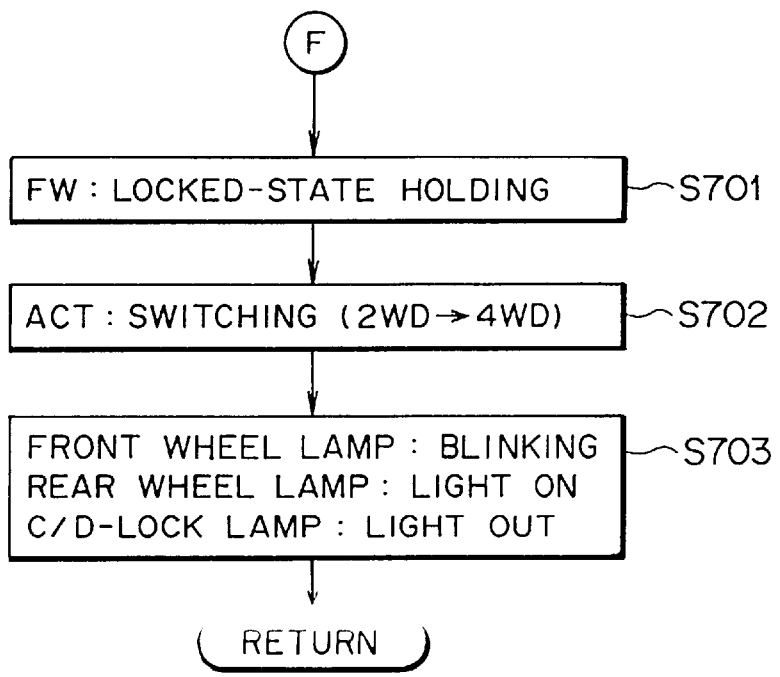
FIG. 13 is a flowchart showing a switching control from 2WD to center diff-4WD, according to the driving state switching unit as the first embodiment of the present invention.

Also, returning to FIG. 7, in the case where in step S108 it is judged that the free wheel mechanism 5 is in the locked state, the process moves to step S701 of FIG. 13. With the free wheel mechanism 5 held in the locked state (step S701), the current indicating value to the electric motor 51 of the shift actuator 50 is returned from the second indicating value to the first indicating value, and the switching of the 2WD/4WD switching sleeve 34 to the center diff-4WD position is again continued (step S702). Even in this case, the front wheel lamp 113 of the indicator lamp 116 remains blinking (step S703).

Figure 14:
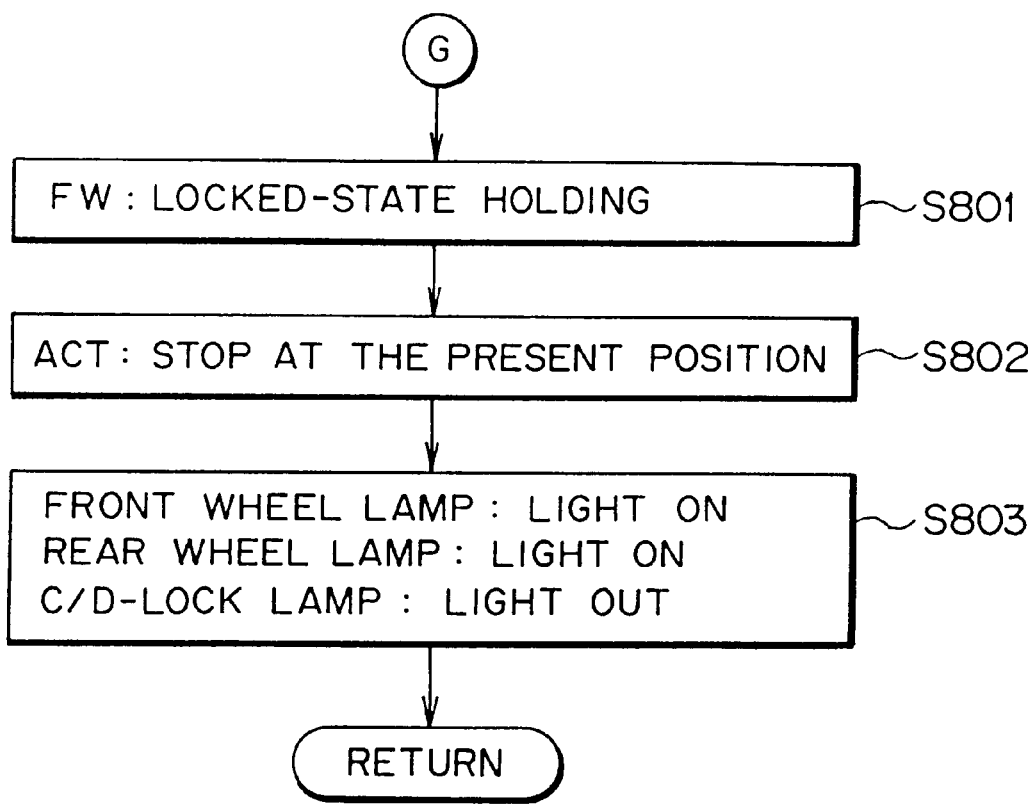
FIG. 14 is a flowchart showing a switching control from 2WD to center diff-4WD, according to the driving state switching unit as the first embodiment of the present invention.

And in the case where in step S107 it is judged that the transfer 4 has been switched to the 4WD state, i.e., the case where the 2WD/4WD detection switch 61 and the 4WD detection switch 62 are on, the process moves to step S801 in FIG. 14. The free wheel mechanism 5 is held in the locked state (step S801), and the shift actuator 50 is stopped at the present position (step S802). In addition, in the indicator lamp 116, the front lamp 113 being blinking is switched on at all times, and it is displayed to the driver that the driving state of the vehicle 1 has been switched to the center diff-4WD state (step S803).

Thus, according to the driving state switching unit of this embodiment, the synchronous state of the synchro-mechanism 35 can be judged based on a current value that is actually supplied to the electric motor 51 of the shift actuator 50. Therefore, there is no need to provide dedicated switches and there is an advantage that costs can be reduced. In addition, after surge current at the time of start of the electric motor 51 has flowed, an average current value within a predetermined time is employed as a criterion for judging the synchronous state of the synchro-mechanism 35, so there is also an advantage that an accurate judgement can be made according to variations in running conditions such as vehicle speed, accel opening degree and the like.

Furthermore, when switching the driving state from 2WD to center diff-4WD, the driving state is switched to the center diff-4WD, with the free wheel mechanism 5 locked. Therefore, the misengagement between the 2WD/4WD switching sleeve 34 and the clutch gear 33 due to collapse of synchronization on a non-driving wheel side can be prevented, and also there is an advantage that the durability deterioration, etc., of the VCU 47 due to idling of the center differential unit 40 can be prevented.

Moreover, even if the synchro-mechanism 35 is in a synchronous state, locking of the free wheel mechanism 5 is inhibited if the speed difference between front and rear wheels, computed based on detection signals from the rear and front propeller shaft speed sensors 66, 67, exceeds a predetermined value. Therefore, there is an advantage that a load due to misengagement caused by the speed difference between the clutch gears 72, 73 can be prevented from being given to the free wheel mechanism 5.

In addition, since the switched state of the transfer 4 is displayed on the indicator lamp 116, there is also an advantage that the driver is required not to accelerate, decelerate, steer, etc., during switching.

In the above-mentioned embodiment, while it has been described with regard to the case where a planetary gear is applied as the center differential unit 40, a bevel gear may be applied. Furthermore, the limited slip differential mechanism is not limited to the VCU 47. For instance, it is also possible to provide a HCU or a wet type multiple disc clutch.

In addition, in the above-mentioned embodiment, while a speed difference between the front and rear wheels is computed based on detection signals from the rear and front propeller shaft speed sensors 66, 67, the front axle shaft 17 may be equipped with rotational speed detection means so that a speed difference between the front and rear wheels is computed based on both a detection signal from this rotational speed detection means and a signal from the front propeller shaft speed sensor 67.

Moreover, it is possible to apply the driving state switching unit of this embodiment not only to the aforementioned four-wheel-drive vehicle equipped with a 2WD mode and a center diff-4WD mode, but also to a four-wheel-drive vehicle equipped with a 2WD mode and a direct 4WD mode.

Next, a description will be given of a second embodiment of the present invention.

Figure 15:
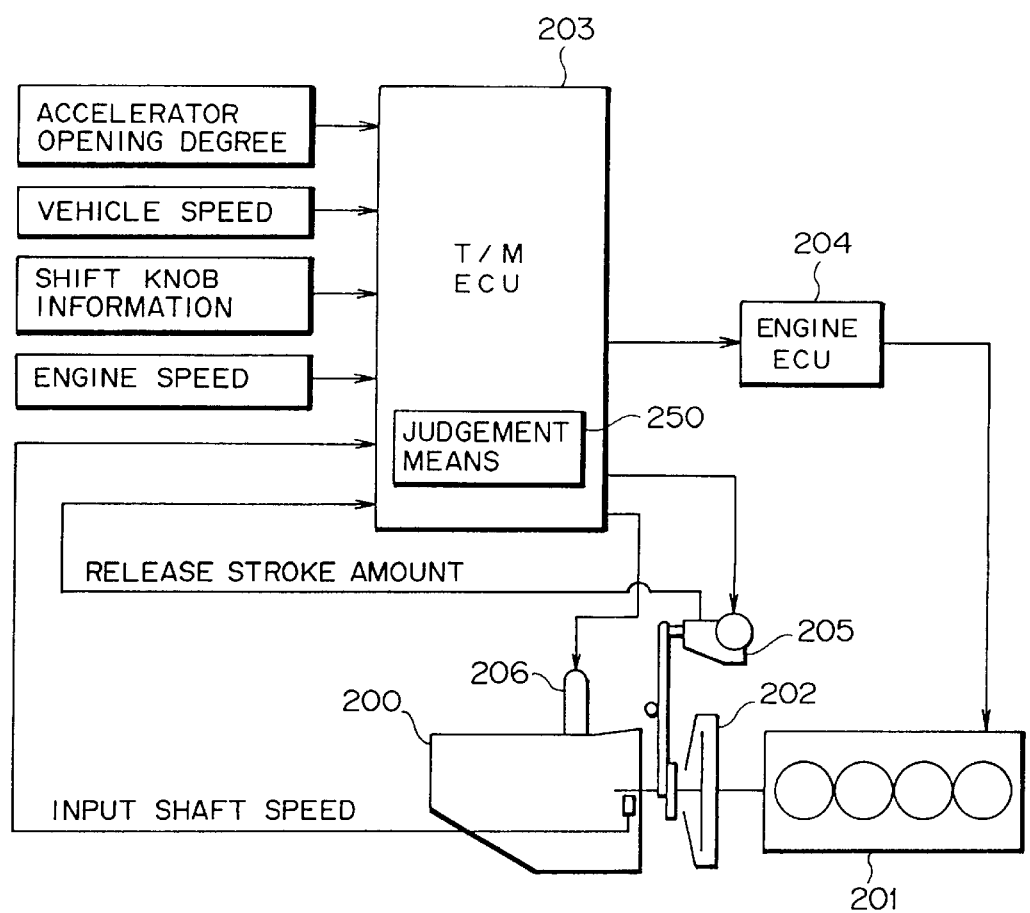
FIG. 15 is a system construction diagram of the automatic clutch system of a vehicle to which a speed change state switching unit as a second embodiment of the present invention is applied.
Figure 16:
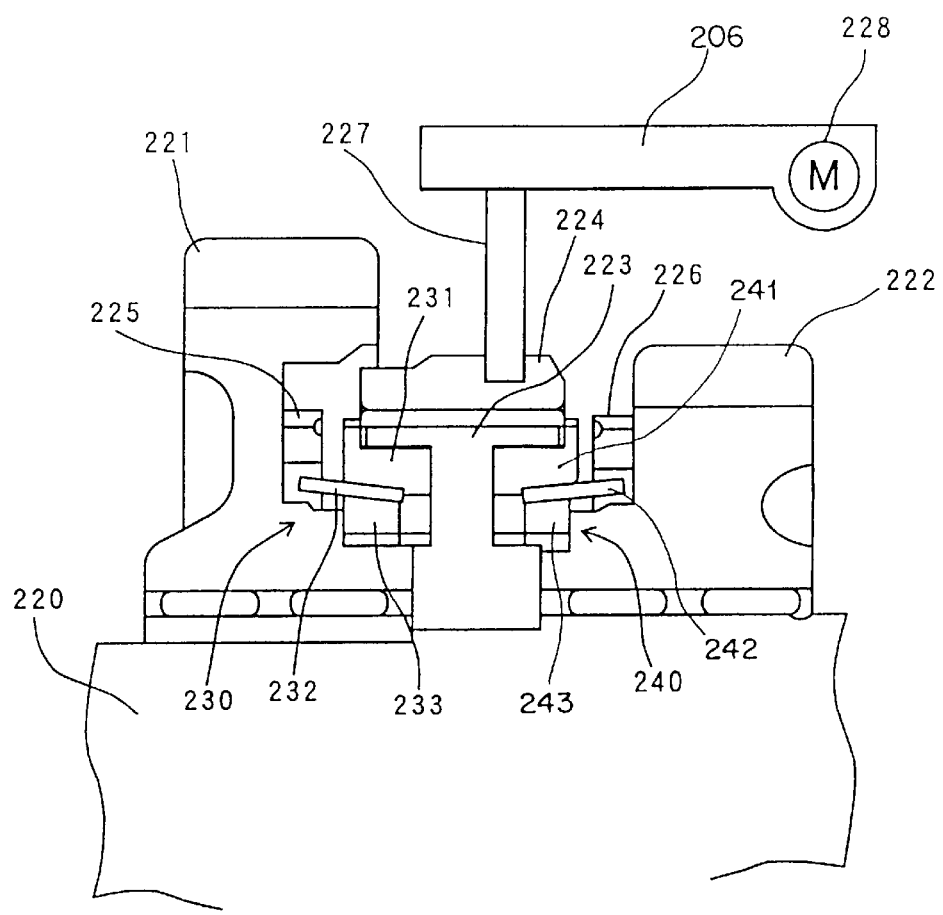
FIG. 16 is a schematic diagram showing the construction of a switching mechanism section, according to the speed change state switching unit as the second embodiment of the present invention.

In the second embodiment of the present invention, the driving state switching unit with a synchro-mechanism of the present invention is constructed as a speed change stage switching unit for switching a stage of a speed change according to the shift manipulation of a driver. FIGS. 15 through 17 illustrate the speed change stage switching unit of the second embodiment of the present invention. In this embodiment, as illustrated in a system construction diagram of FIG. 15, a description will be given with regard to the case where this speed change stage switching unit is constructed as an automatic clutch system for a vehicle.

As illustrated in FIG. 15, this automatic clutch system is constructed primarily of a transmission 200, an engine 201, a clutch (driving-force transmitting clutch) 202 for disconnecting or connecting the transmission of a driving force from the engine 201 to the transmission 200, a transmission electronic control unit (hereinafter referred to as a T/M-ECU) 203 for controlling the transmission 200, and an engine electronic control unit (hereinafter referred to as an engine ECU) 204 for controlling the engine 201.

While the transmission 200 is capable of employing a general manual transmission, this automatic clutch system is equipped with a clutch actuator 205 in order to automatically perform clutch operation without using a clutch pedal. It is also equipped with a shift actuator (electric actuator) 206 in order to automatically perform switching of a shift lever. The clutch actuator 205 and the shift actuator 206 are controlled by the T/M-ECU 203.

FIG. 16 schematically shows a portion of the switching mechanism in the transmission 200 (in this embodiment, a first-and-second speed switching mechanism portion is exemplified). As shown in FIG. 16, a first speed gear 221 and a second speed gear 222 are supported on a main shaft 220 so that they are free to rotate. Between the first speed gear 221 and the second speed gear 222, a first-and-second speed clutch hub (first gear) 223 is fixedly mounted on the main shaft 220. A sleeve (gear connecting member) 224 meshes the outer periphery of the first-and-second speed clutch hub 223 so that it is free to slide axially. The first speed gear 221 and the second speed gear 222 is provided integrally with a first speed clutch gear (second gear) 225 and a second speed clutch gear (second gear) 226, respectively.

Furthermore, synchro-mechanisms 230, 240 are provided between the first-and-second speed clutch hub 223 and the first clutch gear 225 and between the first-and-second speed clutch hub 223 and the second clutch gear 226, respectively. In this embodiment, the synchro-mechanisms 230, 240 adopt a double cone type. The sychro mechanism 230 on the side of the first speed clutch gear 225 is constructed of a center cone 232 supported integrally by the first speed clutch gear 225, an inner ring 233 disposed inside the center cone 232, and an outer ring 232 disposed outside the center cone 232 so that it engages the sleeve 224. Also, the sychro mechanism 240 on the side of the second speed clutch gear 226 is constructed of a center cone 242 supported integrally by the first speed clutch gear 226, an inner ring 243 disposed inside the center cone 242, and an outer ring 241 disposed outside the center cone 242 so that it engages the sleeve 224.

With construction such as this, by moving the sleeve 224 to the side of the first speed gear 221 to engage the first clutch gear 225 through the synchro-mechanism 230, the first-and-second clutch hub 223 and the first speed clutch gear 225 are connected, whereby the speed change stage is switched to first speed. Conversely, by moving the sleeve 224 to the side of the second speed gear 222, the first-and-second clutch hub 223 and the second speed clutch gear 226 are connected, whereby the speed change stage is switched to second speed.

The aforementioned shift actuator 206 is connected to the sleeve 224 through a shift fork 227. When the shift actuator 206 is driven by an electric motor 228, it causes the sleeve 224 to move axially. In the T/M-ECU 203, thrust for moving the sleeve 224 is adjusted, by controlling a current value that is supplied to the electric motor 228, and more specifically, by setting a current indicating value (target value in a feedback control).

An accel opening degree signal, a vehicle speed signal, an engine speed signal, an input shaft speed signal from the transmission 200, a relay's stroke signal from a clutch 202, and furthermore, a shift knob signal (shift selection signal) are input to the T/M-ECU 203. Based on these various input signals and a variation in a current value (monitoring current value) that is actually supplied to the electric motor 228, the T/M-ECU 203 controls the clutch actuator 205 and the shift actuator 206 while adjusting the output of the engine 201 through the engine ECU 204. With this, switching of the speed change stage, selected by driver's shift-knob (not shown) manipulation, is attained.

With a timing chart of FIG. 17, the procedure of switching and controlling a stage of a speed change, according to this speed change stage control unit, will hereinafter be described, making reference to FIG. 16. Assume that in this embodiment, the stage of a speed change has first been set to first speed and that it is then switched to second speed.

First, if it is assumed that a speed change is started at time $t_0$ by driver's shift-knob manipulation, the T/M-ECU 203 gradually reduces an engine output indicating value to be sent to the engine ECU 204. And at the time that the engine output indicating value has gone to 0 so that engine output is cut (time $t_1$), the relay's stroke value to the clutch actuator 205 is maximized and the current indicating value to the electric motor 228 which drives the shift actuator 206 is set to a predetermined first indicating value.

The shift actuator 206 driven by the electric motor 228 starts pushing the sleeve 224 engaging the first speed clutch gear 222 to the side of the second speed clutch gear 225. This movement of the shift actuator 206 causes the sleeve 224 and the first speed clutch gear 225 to be disconnected. When this occurs, sliding resistance acts between the sleeve 224 and the first speed clutch gear 225. In order to output an amount of force that opposes this sliding resistance, the current value flowing through the electric motor 228 (monitoring current value) is temporarily increased, but is gradually reduced as the disconnection between the sleeve 224 and the first speed clutch gear 225 advances. At the time the sleeve 224 and the first speed clutch gear 225 has been disconnected ($t_2$), the current value becomes substantially constant.

The sleeve 224 disconnected from the first speed clutch gear 225 is further pushed to the side of the second speed gear 222, whereby the outer ring 241 of the synchro-mechanism 240 is pushed against the center cone 242. With this, friction force occurs between the center cone 242 and the outer ring 241, and between the center cone 242 and the inner ring 243. Therefore, the synchronization between the sleeve 224 and the second speed clutch gear 226, i.e., the synchronization between the first-and-second clutch hub 223 and the second speed clutch gear 226, is started.

When synchronization by the synchro-mechanism 240 is thus started, movement of the sleeve 224 is temporarily blocked by the outer ring 241 and goes to an decelerated or stopped state, so the current value to be supplied to the electric motor 228 gradually increases according to resistance exerted on the sleeve 228 (see an oblique line portion in FIG. 17). Hence, judgement means 250, which is the functional element of the T/M-ECU 203, judges, at time $t_3$ that an increase in the current value has been confirmed, that synchronization has been started. For example, when the difference between a current value monitored and an average current value exceeds a predetermined threshold value after time $t_2$ that a current value has become substantially constant, it is preferable that the confirmation of an increase in the current value judge that synchronization by the synchro-mechanism 240 has been started.

And when the start of synchronization by the synchro-mechanism 240 is judged by the judgement means 250 (time $t_3$), the T/M-ECU 203 sets the current value being set to the first indicating value, to the second indicating value smaller than the first indicating value. This second indicating value is set according to a gear ratio (in this embodiment, a gear ratio of second speed), and the indicating value is set smaller, as the ratios of speed changes are away from each other.

By setting the current indicating value to the second indicating value, the sleeve 224 and the second speed clutch gear 226 are connected at a speed corresponding to a ratio of speed change. When this occurs, the current value, reduced temporarily when the current indicating value is changed to the second indicating value, will increase again, but will no longer change at a constant or approximately constant value.

Note that a change in the monitoring current value at this time is different from the manner in which the current indicating value in the first embodiment is changed from the first indicating value to the second indicating value (see FIG. 5). This is due to a difference in synchro capacity (synchronous capacity). That is, if synchro capacity is greater, the force to move the sleeve becomes smaller and therefore the current value (monitoring current value) to be supplied to the electric motor becomes smaller. However, as there is a difference in synchro capacity between the synchro-mechanism of the transmission and the synchro-mechanism of the transfer, and the latter is greater in synchro capacity, a change in the monitoring current value of this embodiment differs from that of the first embodiment.

And at time $t_4$ that a predetermined time has elapsed since the current value became constant or approximately constant, the judgement means 250 judges that the engagement between the sleeve 224 and the second speed clutch gear 226 has completed and that switching to second speed (shift switching) has thus been completed.

Based on this judgement of switching completion by the judgement means 250, the T/M-ECU 203 gradually decreases a relay's stroke indicating value, while gradually increasing an engine output indicating value to adjust engine output. In this way the clutch 202 is engaged. And the T/M-ECU 203 reduces the relay's stroke indicating value to 0 where the engine output indicating value is increased to a value corresponding to the opening degree of the accel. With this, the clutch 202 is shifted from a half clutch operation state to a direct coupled state. Note that the current indicating value is set to 0 after the judgement of switching completion, whereby the supply of current to the electric motor 228 is stopped.

The aforementioned procedure is also applied to other speed change stages. Therefore, based on a change in the monitoring current value in the shift actuator 206, the judgement of the synchronization of the shnchro mechanism and the judgement of shift switching completion are made. And based on the judgement of synchronization, shift switching control is performed, and based on the judgement of shift switching completion, a control of engaging the clutch 202 is performed.

Thus, according to the speed change stage switching unit as the second embodiment of the present invention, the start of synchronization by the synchro-mechanisms 230, 240 is judged from a change in the current value (monitoring current value) that is supplied to the electric motor 228 which drives the shift actuator 206. Therefore, there is an advantage that costs can be reduced without providing dedicated sensors, switches, etc.

In addition, by judging synchronization on the basis of a change in the monitoring current value, there is also an advantage that an accurate judgement, corresponding even to an individual difference in the sliding resistance between members, a secular change, and a change in running conditions such as vehicle speed, accel opening degree and the like, becomes possible.

Furthermore, the time to start synchronization can be shortened by setting the current indicating value to the first indicating value which is relatively great, until synchronization is started, and also gears can be connected at a speed corresponding to a ratio of speed change, by setting the current indicating value to the second indicating value corresponding to a speed change ratio of speed change stages after the start of synchronization. Therefore, gear grind or overloading can be prevented. Thus, there is an advantage that quick and reliable switching of a speed change stage is realized.

Moreover, the completion of shift switching is also judged based on a change in the current value (monitoring current value) that is supplied to the electric motor 228, so costs can be reduced without providing dedicated sensors, switches, etc., and also it becomes possible to engage the clutch 202 at proper timing. As a result, there is also an advantage that the drawback of gear grind, etc., due to the engaging timing of the clutch 202 prior to the completion of shift switching, and driver's sense of incompatibility due to the delay of the engaging timing of the clutch 202 from the completion of shift switching, can be prevented.

As mentioned above, while the driving state switching unit for switching a driving state between a 2WD mode and a center diff-4WD mode, and the speed change stage switching unit with an automatic clutch system have been described as the embodiments of the driving state switching unit with a synchro-mechanism of the present invention, the invention is not to be limited the above-mentioned embodiments, but various changes and modifications may be made without departing from the gist of the invention. That is, units, which perform switching of a driving state by the connection of gears through a synchro-mechanism and also require the judgement of synchronization made by the synchro-mechanism, are not limited to the above-mentioned driving state switching unit and speed change stage switching unit, but are widely applicable.

In addition, the synchro-mechanism according to the present invention is not limited to the double cone type synchro-mechanism employed in the above-mentioned embodiments, but includes various types of synchro-mechanisms such as a key type synchro-mechanism, etc.

Industrial Applicability

As described above, the driving state switching unit with a synchro-mechanism of the present invention is useful to units in which an accurate judgement of synchronization made by a synchro-mechanism is demanded, particularly as a driving state switching unit, for a part-time four-wheel-drive vehicle, which switches a driving state between a 2-wheel-drive state and a 4-wheel-drive state, and is also useful as a speed change stage switching unit, for an automatic clutch system, which performs clutch operation and shift operation automatically.

What is claimed is:

1. A driving state switching unit with a synchro-mechanism, comprising:

a first gear and a second gear coaxially disposed;

a gear connecting member axially movable so that the first gear and the second gear can be connected;

a synchro-mechanism interposed between the first gear and the second gear;

an electric actuator for moving the gear connection member;

control means for controlling a supply current to the electric actuator; and judgement means for judging synchronization of the synchro-mechanism, based solely on a change in the supply current value to the electric actuator.

2. The driving state switching unit with a synchro-mechanism as set forth in claim 1, constructed as a speed change stage switching unit for switching a stage of a speed change according to driver's shift manipulation; and further comprising a switching mechanism for switching a stage of a speed change corresponding to a shift position selected by a driver, by switching an engagement relationship between said plurality of gears through the synchro-mechanism;

wherein the judgement means judges synchronization of the synchro-mechanism, based solely on a change in the supply current to the electric actuator, after switching of the speed change stage has been started by the switching mechanism.

* * * * *